US007819750B2

(12) United States Patent
Lam et al.

(10) Patent No.: US 7,819,750 B2
(45) Date of Patent: Oct. 26, 2010

(54) USB SOFTWARE ARCHITECTURE IN A GAMING MACHINE

(75) Inventors: Rex Yinzok Lam, Reno, NV (US); Nadeem Ahmad Quraishi, Reno, NV (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 1537 days.

(21) Appl. No.: 10/460,822

(22) Filed: Jun. 11, 2003

(65) Prior Publication Data

US 2004/0254006 A1 Dec. 16, 2004

Related U.S. Application Data

(60) Continuation-in-part of application No. 10/246,367, filed on Sep. 16, 2002, now Pat. No. 6,899,627, which is a continuation-in-part of application No. 10/214, 255, filed on Aug. 6, 2002, now Pat. No. 7,351,147, which is a continuation of application No. 09/635,987, filed on Aug. 9, 2000, now Pat. No. 6,503,147, which is a division of application No. 09/414,659, filed on Oct. 6, 1999, now Pat. No. 6,251,014.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................... 463/43; 463/29

(58) Field of Classification Search .................. 463/40, 463/41, 47

See application file for complete search history.

(56) References Cited

U.S. PATENT DOCUMENTS 4,301,505 A 11/1981 Catiller et al. .............. 364/200

(Continued)

FOREIGN PATENT DOCUMENTS

CA 2484568 2/2001

(Continued)

OTHER PUBLICATIONS

SecureWave SecureEXE & SecureNT Version 2.5 Sep. 23, 2002 http://web.archive.org/web/20021003212544/securewave.com/products/secureexe/version2.5.html.*

(Continued)

*Primary Examiner*—Pierre E Elisca
*Assistant Examiner*—R. Renwick
(74) *Attorney, Agent, or Firm*—Weaver Austin Villeneuve & Sampson LLP

(57) ABSTRACT

A disclosed gaming machine is coupled to a plurality of "USB gaming peripherals." The USB gaming peripherals, which may include one or more peripheral devices, communicate with a master gaming controller using a USB communication architecture. As part of the USB communication architecture, a USB device class manager may configure a USB device interface. The USB device interface may comprise a plurality of USB drivers where the USB device drivers are used to provide interfaces that are compatible with the gaming operating system such that processes in the gaming operating system may use USB communications to communicate with the plurality of USB gaming peripherals. Further, the USB device class manager may authorize the connection of each USB gaming peripheral to the USB device interface. In addition, the USB device class manager may be capable of downloading firmware to the USB gaming peripherals.

50 Claims, 11 Drawing Sheets

U.S. PATENT DOCUMENTS

| | | | | |
|---|---|---|---|---|
| 4,562,708 | A | 1/1986 | Gros | 70/94 |
| 4,652,998 | A | 3/1987 | Koza et al. | 364/412 |
| 4,685,677 | A | 8/1987 | DeMar et al. | |
| 4,799,635 | A | 1/1989 | Nakagawa | 364/900 |
| 5,259,626 | A | 11/1993 | Ho | 273/438 |
| 5,367,644 | A | 11/1994 | Yokoyama et al. | 395/325 |
| 5,379,382 | A | 1/1995 | Work et al. | 395/275 |
| 5,379,920 | A | 1/1995 | Lee | 713/202 |
| 5,453,928 | A | 9/1995 | Kaminkow et al. | |
| 5,559,794 | A | 9/1996 | Willis et al. | 370/58.3 |
| 5,593,350 | A | 1/1997 | Bouton et al. | 463/36 |
| 5,643,086 | A | 7/1997 | Alcorn et al. | 463/29 |
| 5,708,838 | A | 1/1998 | Robinson | 395/800 |
| 5,721,958 | A | 2/1998 | Kikinis | 395/888 |
| 5,759,102 | A | 6/1998 | Pease et al. | 463/42 |
| 5,761,647 | A | 6/1998 | Boushy | 705/10 |
| 5,815,731 | A * | 9/1998 | Doyle et al. | 710/10 |
| 5,935,224 | A | 8/1999 | Svancarek et al. | |
| 5,958,020 | A | 9/1999 | Evoy et al. | 710/3 |
| 5,978,920 | A | 11/1999 | Lee | |
| 6,003,013 | A | 12/1999 | Boushy et al. | 705/10 |
| 6,061,794 | A * | 5/2000 | Angelo et al. | 726/3 |
| 6,071,190 | A | 6/2000 | Weiss et al. | 463/25 |
| 6,088,802 | A * | 7/2000 | Bialick et al. | 726/3 |
| 6,104,815 | A | 8/2000 | Alcorn et al. | 380/251 |
| 6,106,396 | A | 8/2000 | Alcorn et al. | 463/29 |
| 6,117,010 | A | 9/2000 | Canterbury et al. | 463/20 |
| 6,135,887 | A | 10/2000 | Pease et al. | 463/42 |
| 6,149,522 | A | 11/2000 | Alcorn et al. | 463/29 |
| 6,167,567 | A * | 12/2000 | Chiles et al. | 717/173 |
| 6,226,701 | B1 | 5/2001 | Chambers et al. | |
| 6,251,014 | B1 * | 6/2001 | Stockdale et al. | 463/16 |
| 6,263,392 | B1 * | 7/2001 | McCauley | 710/305 |
| 6,270,409 | B1 | 8/2001 | Shuster | 463/20 |
| 6,270,415 | B1 | 8/2001 | Church et al. | 463/40 |
| 6,272,049 | B1 | 8/2001 | Maruyama et al. | |
| 6,272,644 | B1 | 8/2001 | Urade et al. | |
| 6,279,049 | B1 | 8/2001 | Kang | 710/15 |
| 6,290,603 | B1 | 9/2001 | Luciano, Jr. | 463/25 |
| 6,312,332 | B1 | 11/2001 | Walker et al. | |
| 6,375,568 | B1 | 4/2002 | Roffman et al. | 463/26 |
| 6,443,839 | B2 | 9/2002 | Stockdale et al. | |
| 6,503,147 | B1 | 1/2003 | Stockdale et al. | |
| 6,708,231 | B1 * | 3/2004 | Kitagawa | 710/10 |
| 6,839,776 | B2 * | 1/2005 | Kaysen | 710/36 |
| 6,899,627 | B2 | 5/2005 | Lam et al. | |
| 6,931,456 | B2 | 8/2005 | Payne et al. | |
| 6,968,405 | B1 | 11/2005 | Bond et al. | |
| 7,290,072 | B2 | 10/2007 | Quraishi et al. | |
| 7,351,147 | B2 | 4/2008 | Stockdale et al. | |
| 2001/0053712 | A1 | 12/2001 | Yoseloff et al. | |
| 2002/0007425 | A1 | 1/2002 | Kaysen | |
| 2002/0057682 | A1 | 5/2002 | Hansen et al. | |
| 2002/0107067 | A1 | 8/2002 | McGlone et al. | 463/20 |
| 2002/0147049 | A1 * | 10/2002 | Carter, Sr. | 463/42 |
| 2002/0155887 | A1 | 10/2002 | Criss-Puszkiewicz et al. | |
| 2002/0187830 | A1 | 12/2002 | Stockdale et al. | |
| 2003/0054880 | A1 | 3/2003 | Lam et al. | |
| 2003/0054881 | A1 | 3/2003 | Hedrick et al. | |
| 2003/0064811 | A1 | 4/2003 | Schlottmann | |
| 2004/0254013 | A1 | 12/2004 | Quraishi et al. | |
| 2004/0254014 | A1 | 12/2004 | Quraishi et al. | |

FOREIGN PATENT DOCUMENTS

| | | | |
|---|---|---|---|
| CA | 2 484 568 | | 5/2001 |
| EP | 0478942 | A2 | 4/1992 |
| EP | 0654289 | A1 | 5/1995 |
| EP | 0780771 | A2 | 6/1997 |
| EP | 0875816 | A2 | 11/1998 |
| EP | 0896306 | A1 | 2/1999 |
| EP | 1094425 | A2 | 4/2001 |
| EP | 1 189 182 | | 3/2002 |
| EP | 1 189 183 | | 3/2002 |
| EP | 1 255 234 | | 11/2002 |
| EP | 1 255 234 | A2 | 11/2002 |
| GB | 2254645 | | 10/1992 |
| GB | 2 300 062 | | 10/1996 |
| GB | 2 326 505 | | 12/1998 |
| WO | WO 97/41530 | | 11/1997 |
| WO | WO 00/17749 | | 3/2000 |

OTHER PUBLICATIONS

U.S. Appl. No. 60/094,068, filed Jul. 24, 1998, entitled: "Input Output Interface and Device Abstraction" (69 pages).

Morrow, Jim, "An Exploration of why USB (Universal Serial Bus) would be a good choice for inside the slot Machine communications," Downloaded from the web-site, "www.gamingstandards.com," May 9, 2005.

Flandern Van M: "Device Class Definition for Human Interface Devices (HID)" Universal Serial Bus (USB), XX, XX, Jul. 4, 1999, page complete, XP002143239, the whole document.

International Search Report, Applicant's Reference: IGT1P100.WO, Int'l Appln.: PCT/US2004/018898, 4 page documents entitled: "Protocols And Standards For USB Peripheral Communications".

Universal Serial Bus (USB), 87 page document entitled "Device Class Definition For Human Interface Devices (HID)", XP-002143239, Firmware Specification Apr. 7, 1999, Version 1.1.

International Search Report, International Appln. No. PCT/US2004/018531, Applicant File No. IGT1P099.WO, 4 page document entitled "USB Software Architecture In A Gaming Machine", Dated Mar. 2, 2005.

Flandern Van M: "Device Class Definition for Human Interface Devices (HID)" Universal Serial Bus (USB), XX, XX, Jul. 4, 1999, page Complete, XP002143239, The Whole Document.

Jim Stockdale, Description of the IGT Netplex Associated Interface Systems, pp. 1-2, Systems used in public prior to Oct. 6, 1998.

Levinthal A., et al.: "The Silicon Gaming Odyssey Slot Machine", COMPCON '97. Proceedings, IEEE San Jose, CA USA Feb. 23-26, 1997, Los Alamitos, CA USA, IEEE Comput. Soc, US, pp. 296-301, XP010219553, ISBN: 0-8186-7804-6.

Members of B-Link Technical Committee, "Summary of Comment Regarding Adoption of Internal Bus Standard for Electronic Gaming Machines," 2 Pages, Oct. 26, 1999.

Office Action dated Jul. 24, 2006 from related European Application No. 04754958.9 4 pages.

Office Action dated Jan. 30, 2006 from related Canadian Application No. 2,486,648 4 pages.

"Plug and Play ISA Specification" Version 1.0a, Microsoft and Intel, May 5, 1994.

"Hoyle Casino" Games Domain Reviews. Dec. 1998. [retrieved on May 14, 2003]. Retrieved form the Internet:URL:http//www/gamesdomain/com/gdreview/zones/reviews/pc/jan99/hc.html.

"Leisure Suit Larry's Casino" Ign.com reviews. Sep. 1, 1998. [retrieved on May 14, 2003]. Retrieved from the Internet:URL:http://pc.ign.com/articles/153/153884p1.html.

Quraishi et al., Notice of Allowance and Fee(s) Due dated Jun. 21, 2007 from related U.S. Appl. No. 10/460,826.

5 Star Shareware.com, Hoyle Casino 99 Wysiwyg://76/http://www.5starshareware.com/Games/Casino/hoyle-casino99.html.

U.S. Office Action dated Sep. 5, 2003 from related U.S. Appl. No. 10/214,255, 11 pgs.

U.S. Office Action dated Apr. 28, 2004 from related U.S. Appl. No. 10/214,255, 13 pgs.

U.S. Office Action dated Sep. 15, 2004 from related U.S. Appl. No. 10/214,255, 15 pgs.

U.S. Office Action dated May 3, 2005 from related U.S. Appl. No. 10/214,255, 14 pgs.

U.S. Office Action dated Oct. 19, 2005 from related U.S. Appl. No. 10/214,255, 13 pgs.

"8x931AA, 8x931HA Universal Serial Bus Peripheral Controller User's Manual," Intel Corporation. Sep. 1997 (see also http://developer.intel.com/design/usb).

European Office Action dated Dec. 14, 2006 from related European Application No. 04 755 212.0/1229, 4 pgs.
European Office Action dated Dec. 14, 2006 from related European Application No. 04 754 963.9-1229.
U.S. Office Action dated Feb. 4, 2003 from related U.S. Appl. No. 10/214,255, 8 pgs.
U.S. Office Action dated May 21, 2003 from related U.S. Appl. No. 10/214,255, 11 pgs.
U.S. Office Action dated Apr. 27, 2007 from related U.S. Appl. No. 10/214,255, 12 pgs.
U.S. Office Action dated Jan. 12, 2007 from related U.S. Appl. No. 10/460,826, 10 pgs.
Universal Serial Bus Specification, Revision 2.0; Apr. 27, 2000.
U.S. Office Action dated Oct. 3, 2008 from related U.S. Appl. No. 10/460,608; 7 pgs.
European Office Action dated Dec. 14, 2006 from corresponding EP Application No. 04 754 963.9-1229.
Quraishi et al., U.S. Office Action dated Jan. 12, 2007 form related U.S. Appl. No. 10/460,826.
European Office Action dated Dec. 14, 2006 form related EP Application No. 04 755 212.0-1229.
"Plug and Play ISA Specification" Version 1.0a, Microsoft and Intel, May 5, 1994.
Stockdale et al., U.S. Office Action dated Feb. 4, 2003 from related U.S. Appl. No. 10/214,255.
"Hoyle Casino" Games Domain Reviews. Dec. 1998. [retrieved form the Internet: URL:http://www.gamesdomain.com/gdreview/zones/reviews/pc/jan99/hc.html.
"Leisure Suit Larry's Casino" Ign.com reviews. Sep. 1, 1998. [retrieved on May 14, 2003]. Retrieved from the internet: URL:http://pc.ign.com/articles/153884p1.html.
Stockdale et al., U.S. Office Action dated May 21, 2003 from related U.S. Appl. No. 10/214,255.
Canadian Office Action dated Jan. 30, 2006 from related Canadian Application No. 2,486,648.
Quraishi et al., U.S. Office Action dated Jul. 24, 2006 from related EP Application No. 04754958.9.
Stockdale et al., U.S. Office Action dated Apr. 27, 2007 from related U.S. Appl. No. 10/214,255.

* cited by examiner

USB SOFTWARE ARCHITECTURE IN A GAMING MACHINE

RELATED APPLICATION DATA

The present application claims priority under U.S.C. 120 from U.S. patent Ser. No. 10/246,367, filed on Sep. 16, 2002, and entitled, "USB DEVICE PROTOCOL FOR A GAMING MACHINE," which is a continuation-in-part from U.S. patent application Ser. No. 10/214,255, filed on Aug. 6, 2002, titled "STANDARD PERIPHERAL COMMUNICATION", which is a continuation of U.S. patent application Ser. No. 09/635,987, titled "STANDARD PERIPHERAL COMMUNICATION" filed on Aug. 9, 2000, which is a divisional application from U.S. patent application Ser. No. 09/414,659, titled "STANDARD PERIPHERAL COMMUNICATION" filed on Oct. 6, 1999, which is now U.S. Pat. No. 6,251,014; each of which is incorporated herein by reference.

BACKGROUND OF THE INVENTION

This invention relates to gaming peripherals for gaming machines such as slot machines and video poker machines. More particularly, the present invention relates to communication hardware and methods between gaming devices.

There is a wide variety of associated devices that can be connected to a gaming machine such as a slot machine or video poker machine. Some examples of these devices are lights, ticket printers, card readers, speakers, bill validators, coin acceptors, coin dispensers, display panels, key-pads, touch screens, player-tracking units and button pads. Many of these devices are built into the gaming machine. Often, a number of devices are grouped together in a separate box that is placed on top of the gaming machine. Devices of this type are commonly called a top box.

Typically, the gaming machine controls various combinations of devices. These devices provide gaming functions that augment the characteristics of the gaming machine. Further, many devices such as top boxes are designed to be removable from the gaming machine to provide flexibility in selecting the game characteristics of a given gaming machine.

The functions of any device are usually controlled by a "master gaming controller" within the gaming machine. For example, during a game the master gaming controller might instruct lights to go on and off in various patterns, instruct a printer to print a ticket or send information to be displayed on a display screen. For the master gaming controller to perform these operations, connections from the device are wired directly into some type of electronic board (e.g., a "back plane" or "mother board") containing the master gaming controller.

To operate a device, the master gaming controller requires parameters, operational characteristics and configuration information specific to each peripheral device. This information is incorporated into software and stored in some type of memory device on the master gaming controller. This device-specific software operates the functions of the device during a game. As an example, to operate a set of lights, the software for the master gaming controller would require information such as the number and types of lights, functions of the lights, signals that correspond to each function, and the response time of the lights.

Traditionally, in the gaming industry, gaming machines have been relatively simple in the sense that the number of peripheral devices and the number of functions the gaming machine has been limited. Further, in operation, the functionality of gaming machines was relatively constant once the gaming machine was deployed, i.e., new peripheral devices and new gaming software were infrequently added to the gaming machine. Often, to satisfy the unique requirements of the gaming industry in regards to regulation and security, circuit boards for components, such as the backplane and the master gaming controller, have been custom built with peripheral device connections hard-wired into the boards. Further, the peripheral device connections, communication protocols used to communicate with the peripheral devices over the peripheral device connections, and software drivers used to operate the peripheral devices have also been customized varying from manufacturer to manufacturer and from peripheral device to peripheral device. For example, communication protocols used to communicate with peripheral devices are typically proprietary and vary from manufacturer to manufacturer.

In recent years, in the gaming industry, the functionality of gaming machines has become increasingly complex. Further, the number of manufacturers of peripheral devices in the gaming industry has greatly increased. After deployment of a gaming machine, there is a desire to i) easily add new capabilities that are afforded by new/upgraded gaming software and new/upgraded peripheral devices from a wide variety of manufacturers and ii) easily change the combinations of internal/external peripheral devices deployed on the gaming machines.

The personal computer industry has dealt with issues relating to device compatibility and, in recent years, there has been a desire in the gaming industry to adapt technologies used in the personal computer industry to gaming. At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be a dequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash, or loss of revenue when the gaming machine is not operating properly.

For the purposes of illustration, a few differences between PC systems and gaming systems are described as follows. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

Another issue not typically addressed in PCs but important in the gaming industry is the existence of many versions of the same type of device. This specialization in the gaming industry results from the limited number of devices used on a gaming machine in conjunction with a large number of manufacturers competing in the market to supply these devices. Further, the entertainment a aspect of gaming machines leads constantly to the development of groups of related devices, such as a group of mechanical wheels or a group of lights employed on a gaming machine, with different operating functions provided solely for entertainment purposes.

One disadvantage of the current method of operation for devices controlled by a master gaming controller is that each time a device is replaced the gaming machine must be shut down. Then, the wires from the device are disconnected from the master gaming controller and the master gaming controller is rewired for the new device. A device might be replaced to change the game characteristics or to repair a malfunction within the device. Similarly, if the circuit board containing the master gaming controller or the master gaming controller itself needs repair, then the wiring from all of the devices connected to the gaming controller must be removed before the gaming controller can be removed. After repair or replacement, the master gaming controller must be rewired to all of the devices. This wiring process is time consuming and can lead to significant down time for the gaming machine. Further, the person performing the installation requires detailed knowledge of the mechanisms within the gaming machine because wiring harnesses, plugs and connectors can vary greatly from gaming device to gaming device and manufacturer to manufacturer. Accordingly, it would be desirable to provide methods and techniques for installing or removing devices and master gaming controllers that simplifies this wiring process and satisfy the unique requirements of the gaming industry.

Another disadvantage of the current operational method of devices used by the gaming machine involves the software for the devices. When a new device is installed on a gaming machine, software specific to the device must be installed on the gaming machine. Again, the gaming machine must be shut down and the person performing this installation process requires detailed knowledge of the gaming machine and the device. Further, the software installation process may have to be performed in the presence of an authority from a regulatory body. Accordingly, it would be desirable to provide methods and techniques that simplify the software installation process and satisfy the unique requirements of the gaming industry.

Another disadvantage of the current gaming environment is that, if the software has not been employed on a gaming machine before, it must be thoroughly tested, verified, and submitted for regulatory approval before it can be placed on a gaming machine. Further, after regulatory approval or as part of the approval process the software is also then tested in the field after placement on the gaming machine. As an example, if the operating characteristics of a gaming device are modified, such that, a new device driver to operate the device is required, then the costs associated with developing and deploying the new device driver on the gaming machine can be quite high.

Further, gaming machine manufacturers are responsible for the reliability of the product that they sell including gaming devices and gaming software provided by third party vendors. These manufacturers are interested in taking advantage of the capabilities offered by third party vendors. However, if a gaming machine manufacturer has to spend an extensive amount of time verifying that third party software is secure and reliable, then it may not be worth it to the manufacturer to use third party software. Accordingly, it would be desirable to provide methods and techniques that simplify the software development and software testing process on gaming machines.

SUMMARY OF THE INVENTION

This invention addresses the needs indicated above by providing a gaming machine having a plurality of "USB gaming peripherals." The USB gaming peripherals, which may include one or more peripheral devices, communicate with a master gaming controller using a USB communication architecture. As part of the USB communication architecture, a USB device class manager may configure a USB device interface. The USB device interface may comprise a plurality of USB drivers where the USB device drivers are used to provide interfaces that are compatible with the gaming operating system such that processes in the gaming operating system may use USB communications to communicate with the plurality of USB gaming peripherals. Further, the USB device class manager may authorize the connection of each USB gaming peripheral to the USB device interface. In addition, the USB device class manager may be capable of downloading firmware to the USB gaming peripherals.

One aspect of the present invention provides a gaming machine. The gaming machine may be generally characterized as comprising: 1) a master gaming controller adapted for i) generating a game of chance played on the gaming machine by executing a plurality of gaming software modules and ii) communicate with a plurality of USB gaming peripherals using USB-compatible communications; 2) the plurality of USB gaming peripherals coupled to the gaming machine and in communication with the master gaming controller; 3) a gaming operating system on the master gaming controller designed for loading gaming software modules into a Random Access Memory (RAM) for execution from the storage device and for unloading gaming software modules from the RAM; 4) a USB device class manager loaded by the gaming operating system designed for i) configuring a USB device interface, which may comprise a plurality of USB drivers for providing interfaces that are compatible with the gaming operating system such that processes in the gaming operating system are capable of using USB communications to communicate with the plurality of USB gaming peripherals and ii) authorizing the connection of each USB gaming peripheral to the USB device interface.

In particular embodiments, the gaming machine may further comprise one or more of the following: 1) a USB stack loaded by the gaming operating system designed for providing a USB communication connection for each of the plurality of USB gaming peripherals to the USB device interface, 2) a storage device for storing approved firmware used by one or more of the USB gaming peripherals, 3) a storage device for storing the plurality of gaming software modules, 4) a plurality of USB-compatible feature drivers wherein each feature driver communicates with a USB feature on one of the gaming peripherals and 5) a USB-compatible host controller. The gaming software modules may be approved for use on the gaming machine by one or more of a gaming jurisdiction, a gaming machine manufacturer, a third-party vendor and a standards association.

In other embodiments, each USB gaming peripheral may comprise: a) a USB-compatible communication connection, b) one or more peripheral devices specific to each USB gaming peripheral where each peripheral device supports one or more USB features, and c) a USB peripheral controller designed or configured i) to control the one or more peripheral devices and ii) to communicate with the master gaming controller using the USB-compatible communications. The USB peripheral controller may further comprise one or more USB-compatible interfaces where, in one embodiment, each USB-compatible interface is mapped to a single USB feature in the one of peripheral devices. In addition, the USB peripheral controller may include a non-volatile memory arranged to store at least one of a) configuration parameters specific to the individual USB gaming peripheral and b) state history information of the USB game peripheral. The configuration parameters may include a mapping of the USB-compatible interfaces to the USB features.

In yet other embodiments, each USB gaming peripherals may include one or more peripheral devices that are selected from a group consisting of lights, printers, coin hoppers, coin dispensers, bill validators, ticket readers, card readers, keypads, button panels, display screens, speakers, information panels, motors, mass storage devices, reels, wheels, bonus devices, wireless communication devices, bar-code readers, microphones, biometric input devices, touch screens and solenoids. Further, one or more of the USB gaming peripherals may further comprise a USB-compatible device controller or a USB-compatible hub. In addition, one or more of the USB gaming peripherals may be designed to receive polls from the USB device class manager and to enter a safe state when a poll is not received from the USB device class manger with a time interval. After a first USB gaming peripheral enters the safe state, no monetary claims may be allowed against the gaming machine.

In additional embodiments, the USB device manager may be further designed for one or more of the following: 1) to control loading or unloading of the USB device drivers into and out of the RAM, 2) to monitor requests to use each of the USB drivers in the USB interface and to load or unload the USB device drivers according to a number of requests to use the USB device drivers, 3) to authenticate an identity of a USB gaming peripheral connected to the gaming machine and 4) to assign encryption keys used to encrypt and decrypt communications between the USB gaming peripherals and the master gaming controller to one or more of the USB gaming peripherals.

In yet other embodiments, the USB device class manager may be further designed to search a file directory structure maintained by the gaming operating system to identify a list of USB drivers to be included in the USB device interface and to compare the list of identified USB drivers with an approved list of USB drivers stored on the gaming machine. The approved list of USB device drivers may vary according to a jurisdiction where the gaming machine is located. Further, the USB device class manager may trigger a safe state in the gaming machine, when an un-approved USB device driver is detected.

In other particular embodiments, the USB device class manager may be further designed to reconfigure the USB device interface for one or more of the following times: 1) when a first USB gaming peripheral is enumerated or un-enumerated on the gaming machine, 2) when the game of chance played on the gaming machine is changed, 3) when a jurisdiction in which the gaming machine is located is changed, and 4) when jurisdictional requirements in which the gaming machine is located are changed.

The USB device class manager may be designed for downloading firmware to one or more the USB gaming peripherals and to authenticate firmware executed by one or more of the USB gaming peripherals. The firmware may be authenticated by comparing a first result from a hashing function applied to the firmware by the USB gaming peripheral with a second result from the hashing function applied to an approved copy of the firmware by the master gaming controller. The firmware may be approved by one or more of a gaming jurisdiction, a gaming machine manufacturer, a third party vendor and a standards association. In a particular embodiment, one or more of the USB gaming peripherals may be initialized without a portion of firmware required for operation. The USB device class manager may be designed to determine which of the one or more of the USB gaming peripherals require a portion of firmware for operation and to download approved firmware required for operation.

The USB device class manager may also be designed to determine an identity of a first USB gaming peripheral that has connected to the gaming machine and to determine whether the first USB gaming peripheral is an approved gaming peripheral. Further, a safe state in the gaming machine may be triggered, when an un-approved USB gaming peripheral has connected to the gaming machine. In addition, the USB device class manager and the feature drivers may be designed to encrypt and decrypt communications that pass through the USB device interface.

In yet another embodiment, the USB device class manger may also be designed to configure the USB device interface with a first device driver that translates communications between a second device driver and the gaming operating system. The second device driver provides a POSIX file system interface. Further, the USB device class manager may be designed to support one or more device classes selected from group consisting of standard USB device classes and vendor-specific device classes. For example, the standard USB device classes may be selected from the group consisting of a human interface device class, an audio class and a printer class.

In other embodiments, the gaming machine may be capable of one or more of 1) determining the gaming jurisdiction in which is located and 2) enumerating each USB gaming peripheral to determine the capabilities of each of the USB gaming peripherals. The master gaming controller may be designed or configured to run feature client processes that communicate with one of the USB features using a USB driver associated with the feature. The communications between the USB gaming peripherals and the master gaming controller may be encrypted. Therefore, the master gaming controller may include a memory storing software for encrypting, decrypting, or encrypting and decrypting the USB-compatible communications between the master gaming controller and at least one of the USB gaming peripherals.

In yet other embodiments, each USB driver may be capable of communicating with one or more USB features. The USB drivers may be loaded as one of shared objects or dynamic link libraries. The USB drivers may be compatible with at least one standard USB device class or one USB vendor-specific device class.

Another aspect of the invention pertains to computer program products including a machine-readable medium on which is stored program instructions for implementing any of the methods described above or within the specification. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

One objective of this invention is to provide an interface between gaming machines and USB-compatible gaming peripherals that satisfies the unique requirements of the gaming industry. This objective is met through the introduction of a robust software architecture that is USB-compatible and meets the requirements of a gaming environment in which gaming machines operate. A few of these requirements are high security, ease of maintenance, expandability, configurability, and compliance with gaming regulations. To satisfy these requirements, the host software may be designed to apply restrictions on USB drivers and USB gaming peripherals in regards to both their development and implementation.

Figure 1A:
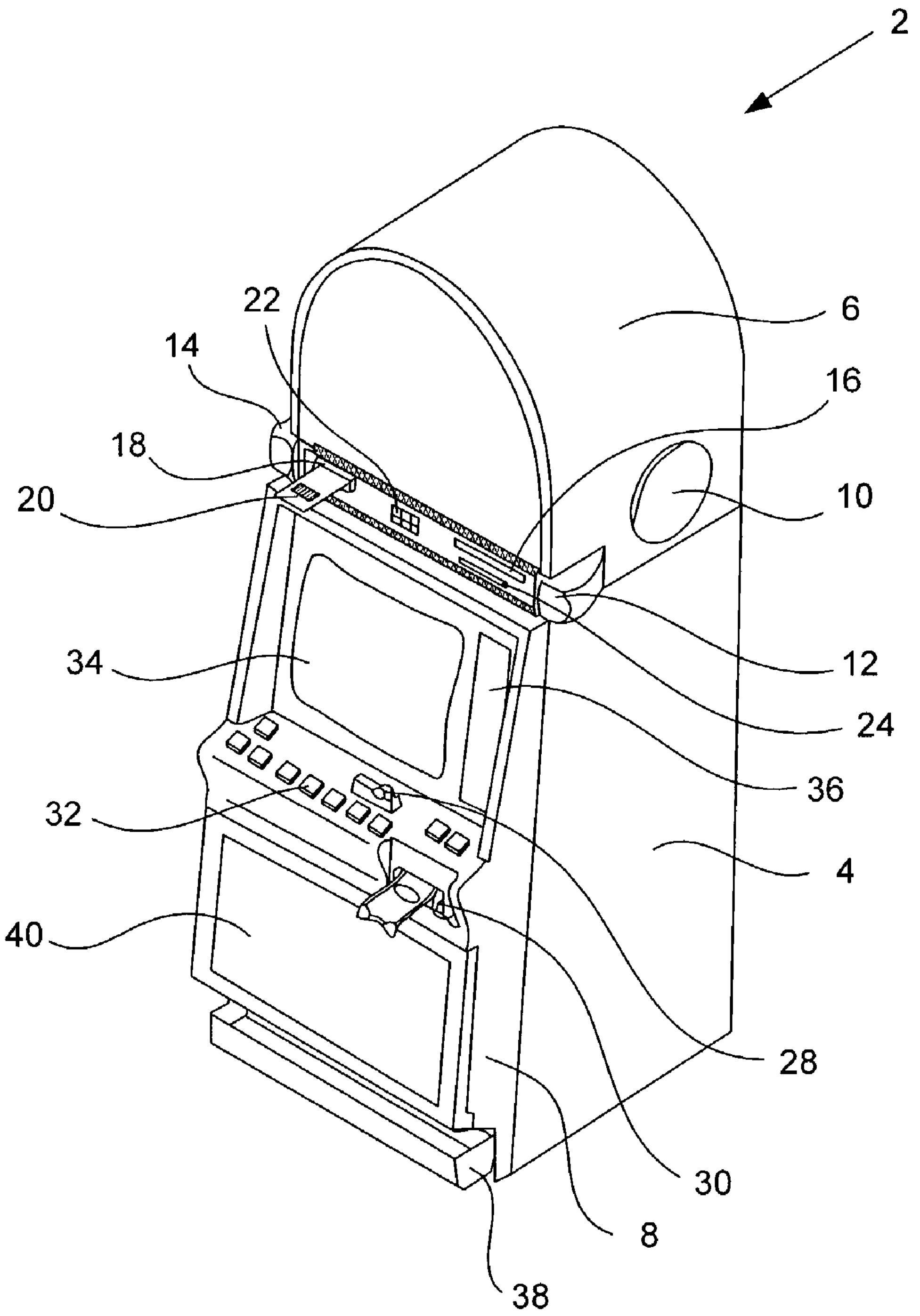
FIG. 1A is a perspective drawing of a gaming machine having a top box and other devices.
Figure 1B:
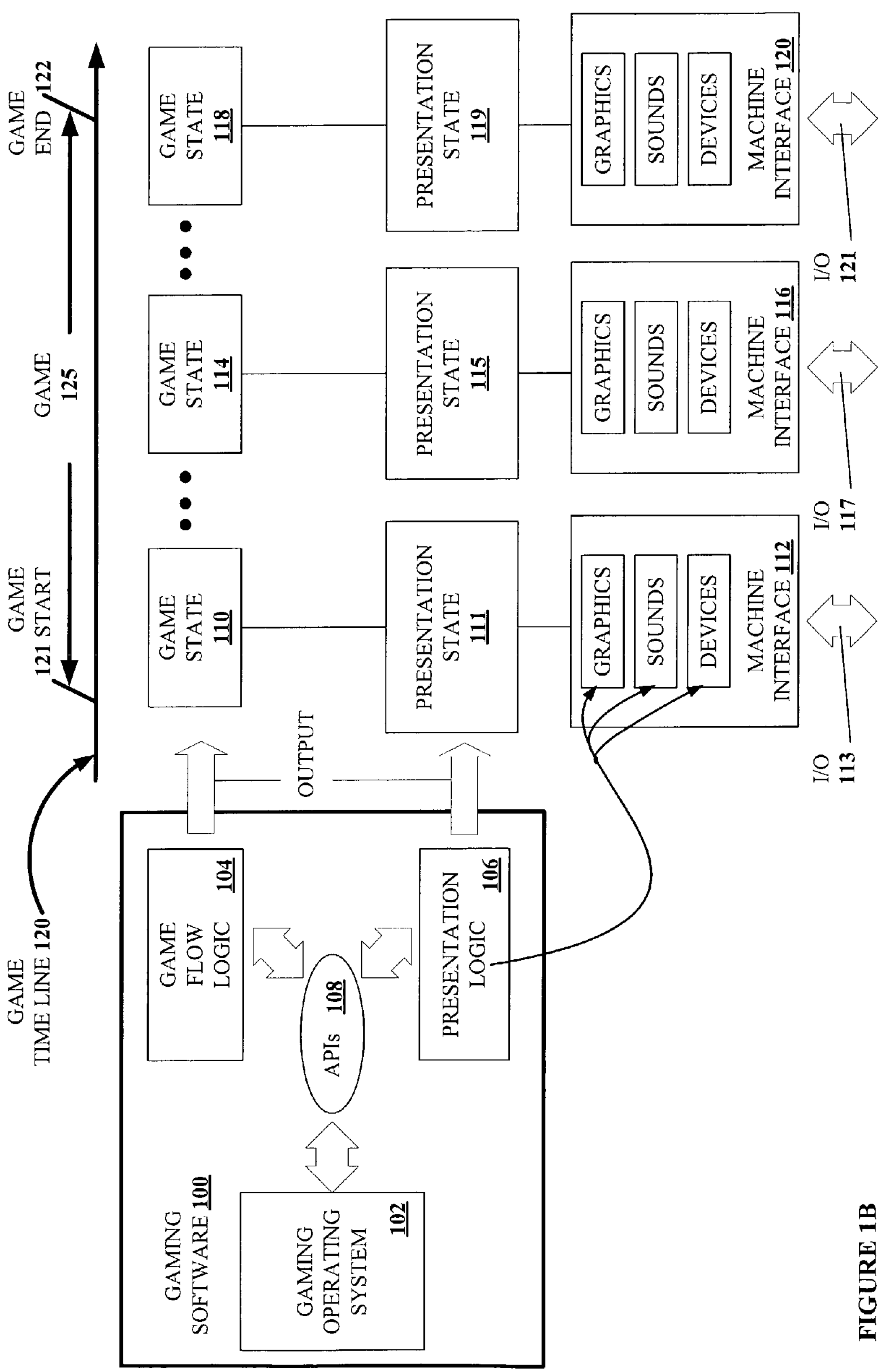
FIG. 1B is a block diagram of a gaming machine software architecture and its interaction with a gaming machine interface for generating a game of chance on a gaming machine.
Figure 1C:
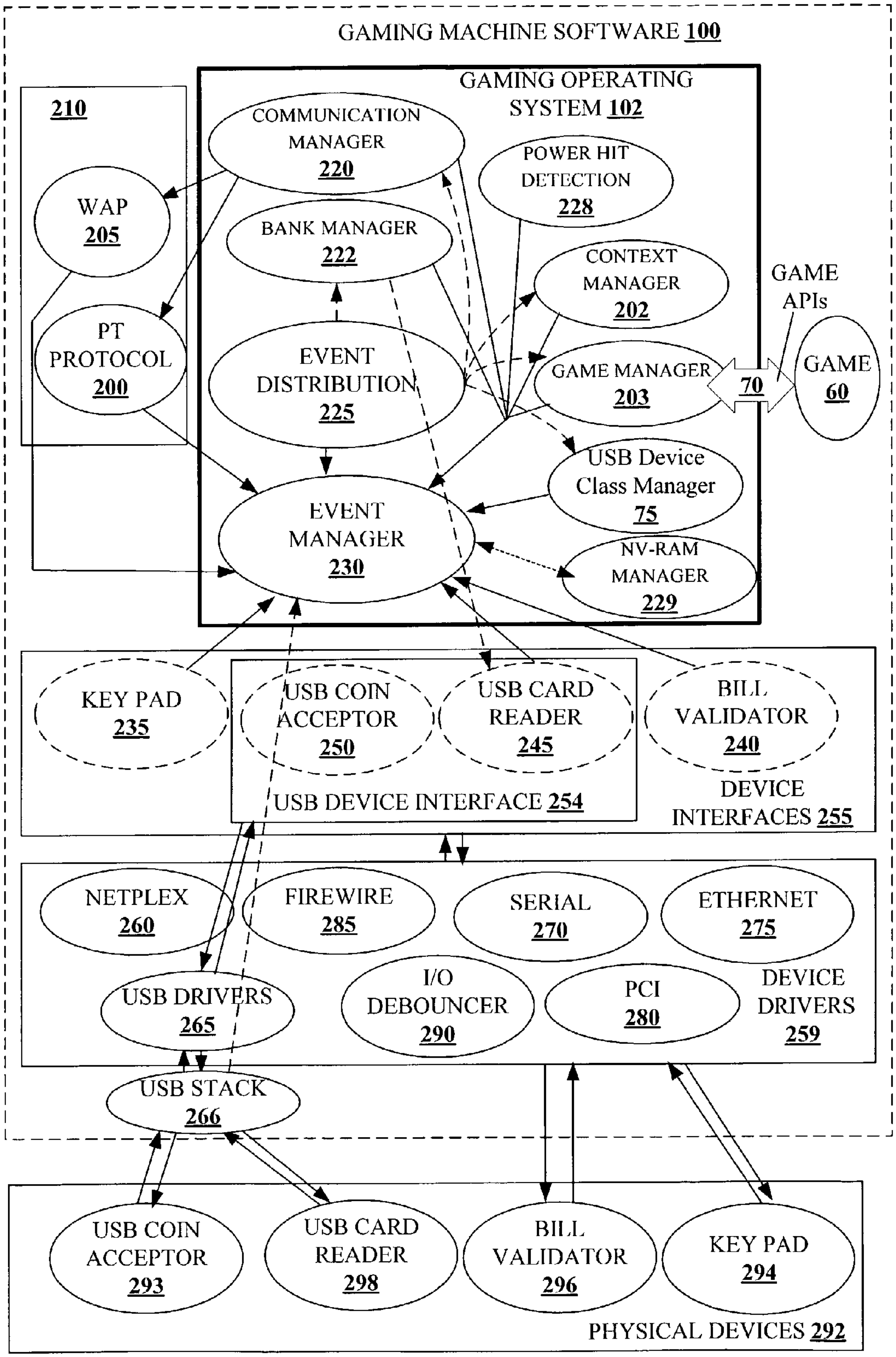
FIG. 1C is a block diagram of a gaming machine software architecture providing gaming software for generating a game of chance on a gaming machine.

In FIGS. 1A-C, 2-9, the USB communications software architecture of the present invention is described. In particular, in FIG. 1A, a gaming machine with gaming devices for generating a game of chance and its operation at the physical level is primarily described. In FIG. 1B, a high-level description of a gaming software architecture and its interaction with the gaming machine interface is described. In FIG. 1C, details of the gaming machine software architecture are described including embodiments of the USB communication architecture of the present invention. In FIGS. 2-9, further details of the USB communication architecture and its implementation on a gaming machine and in a gaming system are provided.

In FIG. 1A, a perspective drawing of video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. A coin dispenser, not shown, may dispense coins into the coin tray. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk-screened glass panel with lettering to indicate general game information including, for example, the number of coins played. Many possible games of chance, including traditional slot games, video slot games, poker games, pachinko games, multiple hand poker games, pai-gow poker games, black-jack games, keno games, bingo games, roulette games, craps games, checkers, board games and card games may be provided with gaming machines of this invention.

The bill validator 30, coin acceptor 28, player-input switches 32, video display monitor 34, and information panel are devices used to play a game of chance on the game machine 2. The devices are controlled by circuitry (See FIG. 5) housed inside the main cabinet 4 of the machine 2. The control circuitry in the housing is referred to as a "master gaming controller" in the present invention. In the operation of these devices, critical information may be generated that is stored within a non-volatile memory storage device 234 (See FIG. 5) located within the gaming machine 2. For instance, when cash or credit of indicia is deposited into the gaming machine using the bill validator 30 or the coin acceptor 28, an amount of cash or credit deposited into the gaming machine 2 may be stored within the non-volatile memory storage device 234. As another example, when important game information, such as the final position of the slot reels in a video slot game, is displayed on the video display monitor 34, game history information needed to recreate the visual display of the slot reels may be stored in the non-volatile memory storage device. The type of information stored in the non-volatile memory may be dictated by the requirements of operators of the gaming machine and regulations dictating operational requirements for gaming machines in different gaming jurisdictions.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key-pad 22 for entering player-tracking information, a florescent display 16 for displaying player-tracking information and a card reader 24 for entering a magnetic striped card containing player-tracking information. Further, the top box 6 may house different or additional devices than shown in the FIG. 1A. For example, the top box may contain a bonus wheel or a back-lit silk-screened panel, which may be used to add bonus features to the game being played on the gaming machine.

Many of the gaming devices on the gaming machine 2 may be directly connected to and in communication with the master gaming controller 224 (see FIG. 5) via various internal wiring harnesses in the cabinet 4 and top box 6 or may be indirectly connected to the master gaming controller through intermediate gaming devices and communication hubs and in communication with the master gaming controller. During a game of chance, the master gaming controller 224 housed within the main cabinet 4 of the machine 2 may control these devices.

In the present invention, a USB-compatible communication architecture, which may comprise USB-compatible hardware, software and methods, may be employed to provide communications between the gaming devices and the master gaming controller. In general, the USB-compatible communication architecture, which is described in FIGS. 1C-6, may be used to provide communications between any two devices on the gaming machine or connected to the gaming machine. In a particular embodiment, a USB device class manager is described which may be used as part of a USB hardware-software interface on the gaming machine.

Understand that gaming machine 2 is but one example from a wide range of gaming machine designs on which the present invention may be implemented. For example, not all suitable gaming machines have top boxes or player-tracking features. Further, some gaming machines have only a single game display—mechanical or video, while others are designed for bar tables and have displays that face upwards. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, or a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 1A, when a user wishes to play the gaming machine 2, he or she inserts cash through the coin acceptor 28 or bill validator 30. The player may also insert a gaming token used as an indicia of credit or activate an indicia of credit stored on a cashless instrument, such as a smart card, magnetic striped card or printed ticket via an input device on the gaming machine. As an example, the bill validator may accept printed ticket vouchers, which may be accepted by the bill validator 30, as indicia of credit for game play. The cashless instruments may also store promotional credits, which may be used for game play on the gaming machine. During the game, the player typically views game information and game play using the video display 34.

During the course of a game, a player may be required to make a number of decisions, which affect the outcome of the game. For example, a player may vary his or her wager on a particular game, select a prize for a particular game, or make game decisions, which affect the outcome of a particular game. The player may make these choices using the player-input switches 32, the video display screen 34 or using some other device which enables a player to input information into the gaming machine. The presentation components of the present invention may be used to determine a display format of an input button. For instance, as described, above, when a touch screen button is activated on display screen 34, a presentation component may be used to generate an animation on the display screen 34 of the button being depressed (e.g., the button may appear to sink into the screen).

Player-tracking software 1 loaded in a memory inside of the gaming machine may capture player choices or actions at the gaming machine. For example, the player-tracking software may capture the rate at which a player plays a game or the amount a player bets on each game. The gaming machine may communicate captured information to a remote server. The player-tracking software may utilize the non-volatile memory storage device to store this information. In one embodiment, a separate player-tracking unit may perform the player-tracking functions. In another embodiment, the master gaming controller may execute player-tracking software and perform player-tracking functions.

The USB-compatible communication architecture of the present invention may be incorporated into a player-tracking unit and other gaming devices that may be connected to a gaming machine but may not be directly controlled by the master gaming controller on the gaming machine. For instance, the player-tracking unit may include a logic device, separate from the master gaming controller, that directly controls a number of peripheral devices, such as a card reader, lights, a video display screen and a button pad. Portions of the USB communication architecture of the present invention may be utilized by the logic device on the player-tracking unit to manage the peripheral devices controlled by the logic device. Details of player-tracking units that may be used with the present invention are described in co-pending U.S. application Ser. No. 10/246,373, filed on Sep. 16, 2002 and entitled "PLAYER TRACKING COMMUNICATION MECHANISMS IN A GAMING MACHINE," which is incorporated herein in its entirety and for all purposes.

During certain game events, the gaming machine 2 may display visual and auditory effects that can be perceived by the player. These effects add to the excitement of a game, which makes a player more likely to continue playing. The presentation components of the present invention may be used to specify light patterns or audio components or to activate other gaming devices, such as a bonus wheel or mechanical reels, in a specified manner, as part of game outcome presentation. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

In general, game play on the gaming machine may comprise 1) establishing credits on the gaming machine for game play, 2) receiving a wager on the game of chance, 3) starting the game of chance, 4) determining the game outcome, 5) generating a presentation of the game of chance on the gaming machine interface to the player (interface comprising displays, speakers, lights, bonus devices, etc.), which may be affected by player choices made before (e.g., a wager amount) or during the game of chance and 6) presenting any award associated with the game outcome to the player.

In FIGS. 1B and 1C, a gaming machine software architecture is described in relation to the generation of different game states on the gaming machine interface. The gaming machine software architecture provides a framework for a generation of presentation states on the gaming machine that correspond to different game states. The presentation states are generated in gaming software logic 100 where the gaming machine interface may be logically abstracted and then translated to an actual operation of various gaming devices comprising the gaming machine interface. The gaming machine interface may comprise gaming devices and gaming peripherals mounted on the gaming machine or connected to the gaming machine, such as displays, lights, audio devices, bill validators, coin dispensers, input devices and output devices that provide the interface to a user of the gaming machine and allow the gaming machine to operate as intended. Some examples of these devices and their operation were described with respect to FIG. 1A. The present invention provides a USB-compatible communications architecture, including both hardware and software, that allows the logical abstraction of the gaming machine interface (software) to be implemented on the gaming machine interface (hardware.)

In FIG. 1B, the gaming machine software architecture provides gaming software 100 that is divided into a plurality of gaming software modules. The gaming software modules may communicate with one another via application program interfaces. The logical functions performed in each gaming software module and the application program interfaces used to communicate with each gaming software module may be defined in many different ways. Thus, the examples of gaming software modules and the examples of application program interfaces in the present invention are presented for illustrative purposes only and the present invention is not limited to the gaming software modules and application program interfaces described herein.

Three gaming software modules, a gaming Operating System (OS) 102, a presentation logic module 104 and a game flow logic module 106 used to present a game of chance 125 on a gaming machine are shown. Further details of the gaming machine operating system and the hardware-software interface are described with respect to FIG. 1C. The gaming operating system 102, the presentation logic module 106 and the game flow logic module 104 may be decoupled from one another and may communicate with one another via a number of application program interfaces 108.

In general, APIs 108 let application programmers use functions of a software module without having to directly keep track of all the logic details within the software module used to perform the functions. Thus, the inner working of a software module with a well-defined API may be opaque or a "black box" to the application programmer. However, with knowledge of the API, the application programmer knows that a particular output or set of outputs of the software module, which are defined by the API, may be obtained by specifying an input or set of inputs specified by the API.

The gaming OS 102 may load different combination of game flow logic modules 104 and presentation logic modules 106 to play different games of chance. For instance, to play two different games of chance, the game OS 102 may load a first game flow logic module and a first presentation logic module to enable play of a first game and then may load a second presentation logic module and use it with the first game flow logic module to enable play of a second game. As another example, to play two different games of chance, the game OS 102 may load a first game flow logic module and a first presentation logic module to enable play of a first game and then may load a second game flow logic module and a second presentation logic module to enable play of a second game. Details of the APIs 108 and the gaming software 100 including the Game OS 102, the game flow logic 104 and the presentation logic 106, are described in Co-pending U.S. application Ser. No. 10/040,239, filed on Jan. 3, 2002, by LeMay et al, titled, "Game Development Architecture that Decouples the Game Logic from the Graphics Logic," which is incorporated herein in its entirety and for all purposes.

The Gaming OS 102 comprises logic for core machine-wide functionality. It may control the mainline flow as well as critical information such as meters, money, device status, tilts and configuration used to play a game of chance on a gaming machine. Further, it may be used to load and unload gaming software modules, such as the game flow logic 104 and the presentation logic 106, from a mass storage device on the gaming machine into RAM for execution as processes on the gaming machine (see FIG. 1C). The gaming OS 102 may maintain a directory structure, monitor the status of processes and schedule the processes for execution.

The game flow logic module 104 comprises the logic and the state machine to drive the game 125. The game flow logic may include: 1) logic for generating a game flow comprising a sequence of game states, 2) logic for setting configuration parameters on the gaming machine, 3) logic for storing critical information to a non-volatile memory device on the gaming machine and 4) logic for communicating with other gaming software modules via one or more APIs. In particular, after game play has been initiated on the gaming machine, the game flow logic may determine a game outcome and may generate a number of game states used in presenting the game outcome to a player on the gaming machine.

In general, gaming machines include hardware and methods for recovering from operational abnormalities such as power failures, device failures and tilts. Thus, the gaming machine software logic and the game flow logic 104 may be designed to generate a series of game states where critical game data generated during each game state is stored in a non-volatile memory device. The gaming machine does not advance to the next game state in the sequence of game states used to present a game 125 until it confirms that the critical game data for the current game state has been stored in the non-volatile memory device. The game OS 102 may verify that the critical game data generated during each game state has been stored to non-volatile memory. As an example, when the game flow logic module 104 generates an outcome of a game of chance in a game state, such as 110, the gaming flow logic module 104 does not advance to the next logical game state in the game flow, such as 114, until game information regarding the game outcome has been stored to the non-volatile memory device. Since a sequence of game states are generated in the gaming software modules as part of a game flow, the gaming machine is often referred to as a state machine.

In FIG. 1B, a game timeline 120 for a game of chance 125 is shown. A gaming event, such as a player inputting credits into the gaming machine, may start game play 125 on the gaming machine. Another gaming event, such as a conclusion to an award presentation may end the game 122. Between the game start 121 and game end 122, as described above, the game flow logic may generate a sequence of game states, such as 110, 114 and 114 that are used to play the game of chance 125. A few examples of game states may include but are not limited to: 1) determining a game outcome, 2) directing the presentation logic 106 to present the game outcome to player, 3) determining a bonus game outcome, 4) directing the presentation logic 106 to present the bonus game to the player and 5) directing the presentation logic to present an award to the game to the player.

The presentation logic module 106 may produce all of the player display and feedback for a given game of chance 125. Thus, for each game state, the presentation logic 106 may generate a corresponding presentation state (e.g., presentation states 111, 115 and 119 which correspond to game states 110, 114 and 118, respectively) that provides output to the player and allows for certain inputs by the player. In each presentation state, a combination of gaming devices on the gaming machine may be operated in a particular manner as described in the presentation state logic 106. For instance, when game state 110 is an award outcome state, the presentation state 111 may include but is not limited to: 1) animations on one or more display screens on the gaming machine, 2) patterns of lights on various lighting units located on the gaming machine and 3) audio outputs from audio devices located on the gaming machine. Other gaming devices on the gaming machine, such as bonus wheels and mechanical reels, may also be operated during a presentation state.

In general, game presentation may include the operation of one or more gaming devices that are designed to stimulate one or more of the player's senses, i.e. vision, hearing, touch, smell and even taste. For instance, tactile feed back devices may be used on a gaming machine that provides tactile sensations such as vibrations, warmth and cold. As another example, scent generation devices may be provided that generate certain aromas during a game outcome presentation.

The presentation logic 106 may generate a plurality of presentation substates as part of each presentation state. For instance, the presentation state determined by the presentation state logic in a first game of chance may include a presentation substate for a first animation, a presentation substate for a second animation and a third presentation substate for output on a gaming device that generates tactile sensations. In a second game of chance, the presentation state generated by the presentation state logic may be the same as the first game of chance. However, the presentation substates for the second game of chance may be different. For instance, the presentation substates for the second game of chance may include a presentation substate for an animation and a second presentation substate for output on a gaming device that provides scents.

In addition, the presentation state generated by the presentation logic 106 may allow gaming information for a particular game state to be displayed. For instance, the presentation logic module 106 may receive from the gaming OS 102 gaming information indicating a credit has been deposited in the gaming machine and a command to update the displays. After receiving the information indicating the credit has been deposited, the presentation logic 106 may update a credit meter display on the display screen to reflect the additional credit added to the gaming machine.

The gaming devices operated in each presentation state and presentation substate comprise a machine interface that allows the player to receive gaming information from the gaming machine and to input information into the gaming machine. As the presentation states change, the machine interface, such as 112, 116 and 120, may change, and different I/O events, such as 113, 117, 121, may be possible. For instance, when a player deposits credits into the gaming machine, a number of touch screen buttons may be activated for the machine interface 112 allowing a player to make a wager and start a game. Thus, I/O 113 may include but is not limited to 1) the player touching a touch screen button to make a wager for the game 125, 2) the player touching a touch screen button to make a wager and start the game at the same time and 3) the player viewing the credits available for a wager. After making a wager and starting the game using machine interface 112, in game state 114, the player may be presented with a game outcome presentation using machine interface 116. The I/O 117 on the machine interface 116 may include output of various animations, sounds and light patterns. However, for machine interface 116, player input devices, such as touch screen buttons, may not be enabled.

The presentation components of a given presentation state may include but are not limited to graphical components, sound components, scent components, tactile feedback components and gaming device components to be activated on the machine interface 112. For example, presentation state 111 may include the following presentation components: 1) animate input button, 2) animate reels, 3) play sound A for 2 seconds and then play sound B for 1 second, 4) flash light pattern A for two seconds on lighting device A and 5) spin bonus wheel. The presentation logic 106 may be used to specify an implementation of one or more presentation components used on the machine interface for a given presentation state such as the presentation state 111 described above. Further, the presentation logic may be parameterized to allow some output of the presentation module to be easily changed.

In one example, the presentation logic may be designed to generate an activation sequence for a gaming device, such as a mechanical bonus wheel or a light panel, used in a game outcome presentation or a bonus game outcome presentation on the machine interface 112. The presentation logic may include a model file with one or more device drivers for the gaming device and a script file with a series of methods that control the activation of the gaming device via the device drivers. The device drivers model the behavior of the gaming device. Again, the methods may be parameterized to allow a game developer to easily change aspects of the activation sequence for the gaming device. For instance, for a bonus wheel, the methods may include inputs enabling a game developer to change a rate at which the bonus wheel spins, a length of time the wheel spins, and a final position of the wheel. As another example, for a light panel, the methods may include inputs enabling a game developer to change a length of times the panel is activated and a light pattern for the light panel.

In the present invention, the gaming machine software architecture is modularly designed and the gaming machine interface is abstracted in software in a manner that decouples the hardware from the software such that changes in hardware have a minimal or no impact on most of the gaming software 100. For instance, in the presentation logic 106, the spinning of wheels, such as a bonus wheel, may be simply represented as "spin wheel." Any hardware descriptions or features that are specific to a specific type of bonus wheel are typically not included in the presentation logic 106. Thus, this logic can be applied to any type of bonus wheel that is capable of spinning and is independent of the hardware design of the wheel.

In the past, gaming software for gaming machines has not been developed in this decoupled manner. The gaming software has been developed with the gaming features associated with a particular hardware device hard-wired into the presentation logic. Further, the presentation logic 106 has not been decoupled from the game logic 104. Thus, for instance, if one type of bonus wheel with a first set of features was replaced on the gaming machine with a second type of bonus wheel with a second type of bonus features, then presentation logic associated with operating the second type of bonus wheel would have to be changed.

Since in the past, the frequency of changes of gaming devices on gaming machines was small, a coupled and monolithic software design approach had a minimal impact on software development costs. Further, in the past, since games and their associated logic have not been very complex, hardware development costs and software development costs have had similar weights in the development process. However, as games and gaming machines become more complex, software development costs become the dominant cost driver in the development process. This statement is particularly true in the highly regulated gaming environment with its associated software verification requirements. With a desire to have the capability to frequently reconfigure the gaming machine with new gaming devices, the software development costs associated with a coupled approach are very significant.

An advantage of the decoupled approach in the present invention is that the presentation logic 106 or the game flow logic 104 does not have to change each time hardware on the gaming machine is changed. Thus, for instance, if one type of bonus wheel with a first set of features is replaced on the gaming machine with a second type of bonus wheel with a second type of bonus features the presentation logic 106 does not have to changed. Since the presentation logic 106 does not have to be changed, the presentation logic can be re-used without additional testing which can provide tremendous savings in software development costs.

To enable the decoupling of the gaming logic 104 and the presentation logic 106 from the particular hardware implemented on the gaming machine, a communication architecture is needed that allows the gaming machine to learn about new gaming devices installed on the gaming machine without an a priori knowledge of the features of the newly installed device. In one embodiment of the present invention, a USB-compatible communication architecture is implemented. In particular, the USB-compatible communication architecture of the present invention includes a USB device class manager that provides USB-compatible communications between the gaming software 100 and USB gaming peripherals consistent with the decoupled approach described in the preceding paragraphs.

In FIG. 1C, USB software components used in a USB communication architecture, such as a USB Device class manager 75, USB-compatible device interfaces and a USB stack 265 are described in relation to various other processes execute by the Game OS 102 and in relation to hardware devices, such as a USB coin acceptor 293, a USB card reader 298, a bill validator 296 and a key-pad 294, that are part of the gaming machine interface. Various hardware and software architectures may be used to implement this invention and the present invention is limited to the architecture shown in FIG. 1C. The main parts of the gaming machine software 100 are communication protocols 210, the gaming OS 102, device interfaces 255, device drivers 259 and a game 60. The game OS 102 includes a number of processes, such as 75, 202, 203, 220, 222, 228 and 229 and an event distribution system with 1) an event manager 230 and 2) an event distribution 225. The processes in the Game OS 102 are loaded when the gaming machine is powered-up in a pre-defined sequence. The general functions of the communications protocols 210, the gaming OS 102, device interfaces 255, and device drivers 259 are first described. Then, examples of interactions between these components are described.

The game OS 102 may be used to load and unload gaming software modules, such as the communication manager 220, a USB Device Class Manager 75, a bank manager 222, an event manager 230, a game manager 203, a power hit detection 228 and a context manger 202, from a mass storage device on the gaming machine into RAM for execution as processes on the gaming machine. The gaming OS 102 may also maintain a directory structure, monitor the status of processes and schedule the processes for execution. During game play on the gaming machine, the gaming OS 102 may load and unload processes from RAM in a dynamic manner.

The event distribution system is used to provide and route Inter Process Communications (IPC) between the various processes in the game OS 102. A "process" is a separate software execution module that is protected by the operating system and executed by the microprocessor on the master gaming controller 224 (See FIG. 5). When a process is protected, other software processes or software units executed by the master gaming controller can't access the memory of the protected process. Thus, the processes communicate via IPCs.

In the Game OS 102, the processes may provide various services to other processes and other logical entities. Another process that seeks to use a service provided by a process may be referred to a client of that process. For instance, the NV (Non-Volatile)-RAM manager 229 controls access to the non-volatile memory on the gaming machine. During execution of the gaming machine software 100, the non-volatile manager 229 may receive access requests via the event manager 230 from other processes, including a USB Device Class Manager 75, a bank manager 222, a game manager 203 and one or more device interfaces 255 to store or retrieve data in the physical non-volatile memory space. The other software units that request to read, write or query blocks of memory in the non-volatile memory are referred to clients of the NV-RAM manager process.

The event manager 230 is typically a shared resource that is utilized by all of the software applications in the gaming OS 102. The event manager 230 is capable of evaluating game events to determine whether the event contains critical data or modifications of critical data that are protected from power hits on the gaming machine i.e. the game event is a "critical game event." Events may be generated by the operation of gaming devices on the gaming machine, by processes in the game OS 102 and by other resources. For instance, a card inserted into a USB coin acceptor 293 may generate a "coin-in" event. After the event manager 230 receives a game event, the game event is sent to event distribution 225 in the gaming OS 102. Event distribution 225 broadcasts the game event to the destination software units that may operate on the game event. For instance, different processes in the game OS 102, such as the bank manager 222 and the NV-RAM manager 229, may act upon the "coin-in" event.

The events that the gaming machine is capable of responding to and responses to the events, including known and unknown events, are encoded in the gaming machine software 100. Other examples of game events which may be received from one of the physical devices 292, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot and 13) Abandoned card. However, the present invention is not limited to these game events, which are provided for illustrative purposes only.

The game events are distributed to one or more destinations (e.g., processes) via a queued delivery system using the event distribution software process 225. However, since the game events may be distributed to more than one destination, the game events differ from a device command or a device signal, which is typically a point-to-point communication such as a function call within a program or interprocess communication between processes.

The power hit detection software 228 monitors the gaming machine for power fluctuations. When the power hit detection software 228 detects that a power failure of some type may be imminent, an event may be sent to the event manger 230 indicating a power failure has occurred. This event is posted to the event distribution software 225, which broadcasts the message to all of the software units and devices within the gaming machine that may be affected by a power failure.

The context manager 202 arbitrates requests from the different display components within the gaming operating system and determines which entity is given access to the screen, based on priority settings. At any given time, multiple entities may try to obtain control of the screen display. For example, a game may require screen access to show display meters in response to an operator turning a jackpot reset key. This creates a need for one entity to determine to whom and under what circumstances screen control is granted i.e. the context manager 202.

The bank manager 220 acts upon monetary transactions performed on the gaming machine, such as coin-in and coin-out. The game manager 203 acts as the interface for processing game events and game information to and from the game 60 which may include the game flow logic 104 and the presentation logic 106 described with respect to FIG. 1B. The communication manager 220 may manage communications events to and from remote gaming devices, such as player-tracking devices, player-tracking servers and wide area progressive server. Remote gaming devices in this example refer to gaming devices not controlled by the master gaming controller on the gaming machine. For instance, a player-tracking unit, which can be physically mounted to the gaming machine, is considered remote to the master gaming controller, when the player-tracking unit is not controlled by the master gaming controller, which is often the case (Typically, player-tracking units include their own logic device that operate the device.)

The communication protocols typically translate information from one communication format to another communication format. For example, a gaming machine may utilize one communication format while a server providing accounting services may utilize a second communication format. The player-tracking protocol translates the information from one communication format to another allowing information to be sent and received from the server. Two examples of communication protocols are wide area progressive 205 and player-tracking protocol 200. The wide are progressive protocol 205 may be used to send information over a wide area progressive network and the player-tracking protocol 200 may be used to send information over a casino area network. The server may provide a number of gaming services including accounting and player-tracking services that require access to the non-volatile memory on the gaming machine.

The device interfaces 255, including a key-pad 235, a bill validator 240, a USB card reader 245, and a USB coin acceptor 250, are logical abstractions that provide an interface between the device drivers 259 and the gaming OS 102. The device interfaces are typically higher-level abstractions that are generic to many different types of devices. The device interfaces 255 may receive commands from the game manager 203 and other software units requesting an operation for one of the physical devices. The software units are referred to as processes when they are executed. The commands may be methods implemented by the software units as part of the API supported by the software unit.

Device interfaces 255 are utilized in the gaming OS 102 so that changes in the device driver software do not affect the gaming OS 102 and device interface definitions. For example, game events and commands that each physical device 292 sends and receives may be standardized so that each the physical devices 292 send and receive the same commands and the game events. The gaming machine may ignore events and commands not supported by the device interfaces 255. Thus, when a physical device is replaced 292, a new device driver 259 may be required to communicate with the physical device. However, device interfaces 255 and gaming machine system OS 102 remain unchanged. As described above, isolating software units in this manner may hasten game development and the software approval process, which may lower software development costs.

The device drivers provide a translation between the device interface abstraction of a device and the hardware implementation of a device. The device drivers may vary depending on the manufacturer of a particular physical device. For example, a card reader 298 from a first manufacturer may utilize Netplex 260 as a device driver while a card reader 298 from a second manufacturer may utilize a serial protocol 270. Typically, only one physical device of a given type is installed into the gaming machine at a particular time (e.g. one card reader). However, device drivers for different card readers or other physical devices of the same type, which vary from manufacturer to manufacturer, may be stored in memory on the gaming machine. When a physical device is replaced, an appropriate device driver for the device is loaded from a memory location on the gaming machine allowing the gaming machine to communicate with the device uniformly.

The device drivers 259 may communicate directly with the physical devices including a USB coin acceptor 293, a keypad 294, a bill validator 296, a USB card reader 298 or any other physical devices that may be connected to the gaming machine. The device drivers 259 may utilize a communication protocol of some type that enables communication with a particular physical device. Device drivers that are compatible with defined device interfaces used by the gaming machine may be written for each type of physical device that may be potentially connected to the gaming machine. Examples of communication protocols used to implement the device drivers 259 include Netplex 260, USB 265, Serial 270, Ethernet 275, Firewire 285, I/O debouncer 290, direct memory map, serial, PCI 280 or parallel. Netplex is a proprietary IGT standard while the others are open standards.

USB is a standard serial communication methodology used in the personal computer industry. USB Communication protocol standards are maintained by the USB-IF, Portland, Oreg., http://www.usb.org. The present invention may be compatible with different versions of the USB standard, such USB version 1.x and USB version 2.x as well as future versions of USB. Next, software units used in a USB communication architecture to provide USB-compatible communications between a USB-compatible device and the game OS 102 that satisfy unique requirements of a gaming machine such as security requirements and regulatory requirements are described in the following paragraphs.

The USB device class manager 75 manages all of the USB device classes utilized on the gaming machine. A USB device class is a specific term utilized in the USB communication architecture. It is described in more detail with respect to FIG. 7-8.

In general, the USB device class manager initializes, manages and controls the USB device interface 254. The USB device interface 254 may comprise one or more specific device interfaces available on the gaming machine. For example, in FIG. 1C, the USB device interface 254 comprises the USB coin acceptor device interface 250 and a USB card reader device interface 245. The USB coin acceptor 250 and the USB card reader 245 are logical abstractions of these devices that processes in the game OS 102 use when communicating with these devices.

Because the device interface is a logical abstraction of a function of a physical device, the device interface does not necessarily provide a one to one correspondence to a corresponding USB gaming device or a USB gaming peripheral (USB is used as an adjective to indicate USB compatibility). For instance, a USB gaming peripheral may comprise a lights peripheral device and a wheel peripheral device. In one embodiment, the device interface for the USB gaming peripheral with the lights and wheels may be abstracted as two separate device interfaces, one for the wheel feature and one for the lights feature, even though the wheels and lights are located on the same USB gaming peripheral. In another embodiment, a single device interface could be used for the USB gaming peripheral with lights and wheels. Netplex drivers typically use this approach. Thus, a single device interface would support the wheels feature and the lights feature. In yet another embodiment, the lights peripheral device in the USB gaming peripheral may have a number of features that are abstracted as separate device interfaces. Thus, three device interfaces, including a light1, a light2 and the wheel may be abstracted for the USB gaming peripheral where a first device interface supports the light1 feature, a second device interface supports the light2 feature and a third device interface supports the wheel feature. For each device interface, a corresponding device driver is used to allow communication through the USB device interface to its one or more USB features. Mapping USB device interfaces to features is described in more detail with respect to FIG. 8 and co-pending U.S. application Ser. No. 10/246,367 previously incorporated herein.

At power-up, the USB device class manager 75 is loaded into RAM for execution by the game OS 102. After loading, the USB device class manager may search a directory structure managed by the game OS 102 to determine which USB gaming devices are supported by the gaming machine. The directory structure may vary depending on what gaming machine software 100, such as the type of game, is stored on the gaming machine. After determining a list of USB gaming device interfaces supported by the gaming machine, the USB device class manager may load drivers that allow processes in the gaming OS 102 to communicate with each feature supported by the interface. Details of the mapping of interfaces and features are described in more detail with respect to FIG. 8.

In the past, the device interface in the gaming machine software has been static because it was hardwired on a chip, such as an EPROM. Thus, a change in the device interface, such as the addition of a new gaming peripheral to a gaming machine, required the testing of new code, the burning of a new EPROM and the installation of the new peripheral and the new device on the gaming machine. An advantage of the present invention is that the software architecture allows for a variable device interface managed by the USB device manager process 75. For instance, with the present invention, the gaming machine may support different games with different device interfaces. The USB device class manager process 75 may set-up the USB device interface 254 for each game by searching the gaming software associated with each game.

The search conducted by the USB device class manager 75 may be limited to certain file paths in the directory structure where information on gaming devices are allowed to be stored or it may search the entire directory structure. In one embodiment, the search paths may be hard-wired in the software for the USB device class manager 75. In another embodiment, the game OS 102 may determine directory access privileges for each process. Thus, the search by the USB device class manager 75 may be limited according to the portions of the directory structure it may access.

Limiting the search path may provide additional security and increase the speed of the initialization process. For instance, certain portions of the directory structure may be read-only to prevent information for supporting illegal device from being added to the directory structure which, when detected by the USB device class manager 75, could be executed on the gaming machine. Thus, if the illegal device were added in a portion of the directory system outside of the allowed portion of the directory structure, it would not be detected and loaded by the USB device class manager 75.

In one embodiment, the USB device class manager 75 may be launched from a secure memory location, such as a read-only EPROM. The Game OS 102 may check the authenticity of the code for the USB device class manager 75 by performing a verification check, such as performing a CRC hash of the code and comparing with a known value for the code. The launching of the USB device class manager 75 from a secure memory location and/or the authentication of the code may be implemented for security reasons.

In another security measure, the gaming machine may store a list of approved USB device interfaces. After the USB device class manager 75 has determined the USB gaming device interfaces supported on the gaming machine, but prior to loading drivers for each USB gaming device interface, the USB device class manager may compare each USB gaming device interface on its list with the list of approved USB gaming device interfaces. When the USB gaming device class manager 75 determines a USB gaming device interface is approved, the USB gaming device class manager 75 loads the USB driver that allows the processes in the game OS 102 to use the driver to communicate with and/or operate one or more features supported by the loaded USB device interface. When the USB gaming device detects a non-approved device interface on its list, the USB gaming device may generate a "non-approved device interface detected" game event and sent it to the event manager 230. In response to the event, one or more processes in the game OS 102 may respond. For instance, in one embodiment, the gaming machine may be placed in an inoperable tilt state and an attendant may be notified.

The USB class manager process 75 determines the specific device interfaces in the USB device interface 254 (e.g., the USB Card Reader 245 and USB Coin acceptor). Further, the USB device class manager 75 controls what USB gaming devices or USB gaming peripherals may connect to the gaming machine via the USB device interface 254. The standard USB architecture allows any device implementing USB to connect with a USB-compatible computer system. However, gaming machines have higher security requirements than normal computer systems. Therefore, the USB Device class manager 75 may limit USB device connectivity.

As an example, if a non-approved USB device attempts to connect to the gaming machine via the USB device interface 254, the USB device class manager may not load a driver for the unapproved device and may generate a game event that is sent to the event manager 230 indicating that an attempt has been made to connect an illegal device to the gaming machine. Other processes on the gaming machine may respond to the event. For instance, the gaming machine may go in to a "tilt" state in response to an attempt to connect an illegal device and generate/send a security alert message.

In one embodiment, USB devices may connect to the gaming machine via the USB stack 266. The USB stack 266 may allow any USB device to establish a connection with the stack. However, for security reasons, the USB device class manager 75 may not allow all of the USB devices connected to the USB stack 266 to communicate with the game OS 102. When a device connects to the USB stack 266, such as during the initial enumeration process or anytime during operation of the gaming machine, in one embodiment, the USB stack 266 may post an event to the event manager 230 (see dashed arrow from the USB stack 266 to the event manager 230). The event may be routed to the USB device class manager 75. The event may include information (e.g., serial numbers, registered identification information, etc.) regarding the identity of the device that has attempted to connect to the USB stack 266. In another embodiment, the USB stack may bypass the event manager 230 and 266 send the information directly to the USB device manager 75.

Using the identification information provided by the USB gaming peripheral, the USB device class manager 75 may attempt to authenticate the identity of the USB gaming peripheral. In one embodiment, to authenticate the device, the USB device class manager 75 may request a CRC of the firmware on the USB gaming peripheral. The CRC request may include a starting address and an ending address that corresponds to any segment of the firmware. The starting address and the ending address may be generated at random. The requested CRC information from the gaming peripheral may be compared with CRC information generated by the USB device class manager on an authenticated copy of the firmware stored on the gaming machine for the designated address range. When the CRC values generated by the USB gaming peripheral and the USB device class manager are the same, the peripheral device using the firmware may be considered authentic. The authentication check by the USB device class manager may be used to prevent a malicious device from spoofing as an approved peripheral device to the USB device class manger.

When the USB device class manager 75 determines that the device that has connected to the USB stack 266 is an approved device, the USB device class manager may load a driver, such as a shared object compatible with the device (see FIG. 3), and allow communications to proceed. When the device connected to the stack 266 is a non-approved device, the USB device class manager 75 may generate and post an event to the event manager 230 indicating that a non-approved device has attempted to connect to the gaming machine. In response to event, the gaming machine may be placed in a safe state and an attendant may be notified.

In yet another embodiment, features or functions of various USB gaming devices or USB gaming peripherals may be legal in a first gaming jurisdiction but illegal in a second gaming jurisdiction. As previously described, the features and functions of a USB gaming device can be abstracted as separate USB device interfaces. Some of these features on a USB gaming device may be legal in one gaming jurisdiction but illegal in another gaming machine. Based on the gaming jurisdiction in which the gaming machine is located, the USB device class manager 75 may load only the device interfaces that are legal in the local gaming jurisdiction. Therefore, in the case where a USB gaming peripheral is abstracted as a single device interface and the USB gaming peripheral is illegal, communications between the USB gaming peripheral and the gaming system may not be activated. In the case where the features of a USB gaming peripheral or USB gaming device are abstracted as a plurality of device interfaces and a portion of the device interfaces are illegal, the illegal features may be essentially deactivated. The illegal functions are essentially deactivated because the USB gaming peripheral will not load device drivers allowing the processes in the game OS 102 to communicate with the illegal features.

An advantage of this approach is that it may simplify the configuration process when gaming machines are shipped to different gaming jurisdictions. The gaming machine may be shipped with a generic software and hardware configuration. Then, by specifying the jurisdiction in the game OS 102, the USB device class manager 75 may customize the hardware configuration to the requirements of the specified jurisdiction.

The processes described above protect the gaming machine against two possible threat vectors during the initialization and enumeration processes: 1) planted programs on the gaming machine describing non-approved device interfaces and 2) non-approved devices attempting to communicate with the gaming machine through the USB stack. In another security measure, the USB device class manager 75 may implement a poll of the peripheral. The peripheral may be designed to receive polls from the host within a timeout period. When the host fails to poll within the timeout period, the peripheral may enter a safe state where no monetary claim can be made on the machine or the peripheral. In yet another security measure, the USB device class manager may also support CRC verification of peripheral firmware to ensure that the peripheral is running proper firmware at all times. In a further security measure, cryptography may be used in the messages between host and peripheral. This could be used in sensitive transactions between a peripheral and the host. When cryptography is applied, the USB device class manager 75 may assign encryption keys to the peripheral devices. Further, USB device class manager 75 may authenticate an identity of a message sender (e.g., a gaming peripheral) using cryptography techniques. Details of cryptographic methods that may be used with the present invention are described in further detail with respect to FIG. 5 and in co-pending U.S. application Ser. No. 09/993,163, filed Nov. 16, 2001 and entitled, "A Cashless Transaction Clearinghouse," which is incorporated by reference in its entirety and for all purposes.

In another embodiment, the USB device class manager 75 may also support firmware download as a means of upgrading firmware on a USB peripheral or providing firmware to a USB peripheral. In one embodiment, gaming peripherals may connect to the USB stack 266 without a portion or all of the firmware needed to operate. Such devices will contain only enough firmware to allow enumeration and proper identification. During the enumeration process, the USB device class manager 75 may determine which gaming peripherals need firmware and download firmware to the gaming peripherals. Further details of this method are described with respect to FIGS. 5 and 6 and in co-pending U.S. application Ser. No. 10/460,608, filed Jun. 11, 2003, by Quraishi, et al., and entitled, "Download Procedures for Peripheral devices," which is incorporated herein in its entirety and for all purposes.

After the devices are enumerated, communications may begin between processes and physical devices using the USB communications architecture of the present invention. For example, the bank manager 222 may send a command to the USB card reader 245 requesting a read of information of a card inserted into the card reader 298. The dashed arrow from the bank manager 222 to the USB card reader 245 in the USB device interfaces 254 indicates a command being sent from the bank manager 222 to the USB device interfaces 254. The USB card reader device interface 245 may send the message to the device driver for the card reader 298. This communication channel is described in more detail with respect to FIGS. 3 and 4. The device driver for the physical USB card reader 298 communicates the command and/or message to the USB card reader 298 allowing the USB card reader 298 to read information from a magnetic striped card or smart card inserted into the card reader.

The information read from the card inserted into the card reader may be posted to the event manager 230 via an appropriate USB device driver 266 and the USB card reader device interface 245. The gaming machine may employ a transaction based software system. Therefore, critical data modifications defined in a critical game event may be added to a list of critical game transactions defining a state in the gaming machine by the event manager 230 where the list of critical game transactions may be sent to the NV-RAM via the NV-RAM manager 229. For example, the operations of reading the information from a card inserted into the gaming machine and data read from a card may generate a number of critical data transactions. When the magnetic striped card in the card reader 298 is a debit card and credits are being added to the gaming machine via the card, a few of the critical transactions may include 1) querying the non-volatile memory for the current credit available on the gaming machine, 2) reading the credit information from the debit card, 3) adding an amount of credits to the gaming machine, 4) writing to the debit card via the USB card reader 245 and the USB device drivers 265 to deduct the amount added to gaming machine from the debit card and 5) copying the new credit information to the non-volatile memory.

In general, a game event, such as an event from one of the physical devices 292, may be received by the device interfaces 255 by polling or direct communication. The solid black and dashed black arrows indicate event message paths between the various software units. Using polling, the device interfaces 255 regularly send messages to the physical devices 292 via the device drivers 259 requesting whether an event has occurred or not. Typically, the device drivers 259 do not perform any high level event handling. For example, using polling, the USB card reader 245 device interface may regularly send a message to the USB card reader physical device 298 asking whether a card has been inserted into the card reader. Using direct communication, an interrupt or signal indicating a game event has occurred is sent to the device interfaces 255 via the device drivers 259 when a game event has occurred. For example, when a card is inserted into the USB card reader, the USB card reader 298 may send a "card-in message" to the device interface for the USB card reader 245 indicating a card has been inserted, which may be posted to the event manager 230. The card-in message is a game event.

Typically, the game event is an encapsulated information packet of some type posted by the device interface. The game event has a "source" and one or more "destinations." As an example, the source of the card-in game event may be the USB card reader 298. The destinations for the card-in game event may be the bank manager 222 and the communication manager 220. The communication manager may communicate information on read from the card to one or more devices located outside the gaming machine. When the magnetic striped card is used to deposit credits into the gaming machine, the bank manager 222 may prompt the USB card reader 298 via the card reader device interface 255 to perform additional operations. Each game event may contain a standard header with additional information attached to the header. The additional information is typically used in some manner at the destination for the event.

Since the source of the game event, which may be a device interface or a server outside of the gaming machine, is not usually directly connected to destination of the game event, the event manager 230 acts as an interface between the source and the one or more event destinations. After the source posts the event, the source returns back to performing its intended function. For example, the source may be a device interface polling a hardware device. The event manager 230 processes the game event posted by the source and places the game event in one or more queues for delivery. The event manager 230 may prioritize each event and place it in a different queue depending on the priority assigned to the event. For example, critical game events may be placed in a list with a number of critical game transactions stored in the NV-RAM (See FIG. 5) as part of a state in the state-based transaction system executed on the gaming machine.

The various software elements described herein (e.g., the device drivers, device interfaces, communication protocols, etc.) may be implemented as software objects or other executable blocks of code or script. In one embodiment, the elements are implemented as C++objects. The event manager 230, event distribution 225, game manager 203 and other gaming OS software units may also be implemented as C++objects. Each are compiled as individual processes and communicate via events and/or interprocess communication (IPC). Event formats and IPC formats may be defined as part of an API.

Figure 2:
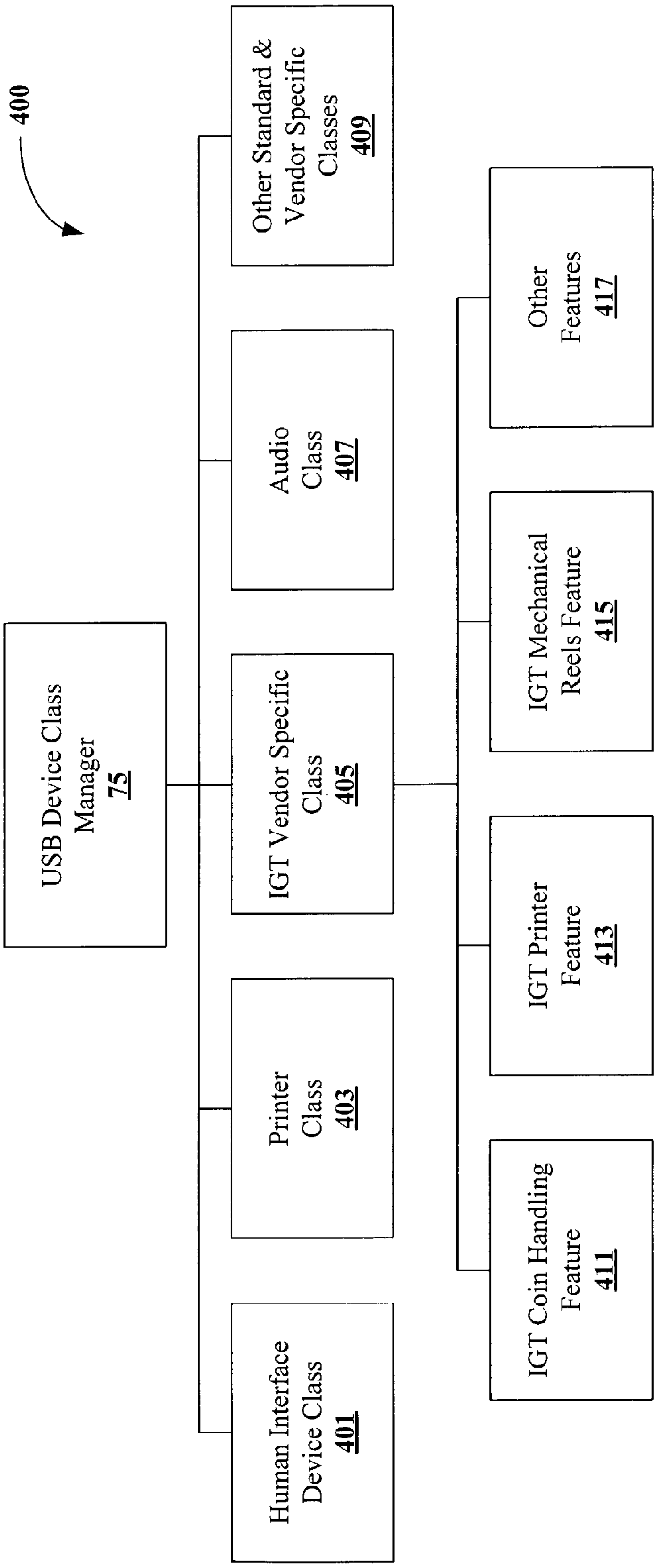
FIG. 2 is a block diagram of device classes and features managed by the device class manager of the present invention.

FIG. 2 is a block diagram of a few examples of device classes and features that may be managed by the USB device class manager of the present invention. A USB device may be subdivided into a number of logical components, such as device, configuration, interface and endpoint. Class specifications define how the USB device uses these components to deliver the functionality provided to the host system. The class specifications may vary from class to class. In some cases, the class specifications are standards that are maintained by USB user group organization and have been subjected to a review and approval process by the USB user group. For instance, the USB HID (Human interface device) class 401, the printer class 405 and the audio class 407 are standard USB classes that may be supported by the USB device class manager. In other cases, the class specifications may be a vendor-specific class that has been developed by a vendor to meet the specific needs of a vendor. For instance, the IGT vendor-specific class 405 is a vendor-specific class that may be supported by the USB device class manager 75 of the present invention. Details of the IGT vendor-specific class are described in co-pending U.S. application Ser. No. 10/460,826, filed Jun. 11, 2003, by Quraishi, et al, entitled “Protocols and Standards for USB Peripheral Communications,” which is incorporated herein in its entirety and for all purposes. The present invention is not limited to the few standard and to the few vendor-specific classes shown in FIG. 2 and other classes, such as 409, may be supported by the USB device class manager 75.

A USB class describes a group of devices or interfaces with similar attributes or services. The actual definition of what constitutes a class may vary from one class to another. It is important to note that USB provides a framework for generating the class specification but that the actual implementation of the class specification may be a unique embodiment that is generated by the developer or developers of the class specification. Typically, two devices (or interfaces) may be placed in the same class if they provide or consume data streams having similar data formats or if both devices use a similar means of communicating with a host system. USB classes may be used to describe the manner in which an interface communicates with the host, including both the data and control mechanisms.

The IGT Vendor-specific class is written to support specific needs of the gaming industry, such as security requirements, that may not be met by other classes. It differs from other classes, such as HID, in that it provides methods of secure communications such as encryption which are not provided in the HID class. It must be remembered that standard USB classes such as HID are written to maximize case of connectivity in a PC environment so that as many devices as possible may easily connect to the PC system. In the gaming industry, due to security concerns, maximizing connectivity is balanced against security concerns. For instance, if a rogue device is connected to a gaming system that fools the gaming machine into registering false credits on the gaming machine or a communication is altered that fools the gaming machine into registering false credits, direct theft of cash may occur. In the PC industry, this type of security breach is not generally a concern. In this concern, the gaming machine is more closely aligned with the banking industry and in particular, its security requirements are akin to automatic teller machines. Therefore, in the PC industry, standard USB device classes have not been written to address the security issues important to the gaming industry.

The logic for each USB gaming peripheral may be abstracted into a collection of USB features. A USB feature may be independent code that controls a single I/O device or several essentially identical I/O devices, such as reels or bonus wheels. The present invention may support one or more features in each class. For example, the USB device class manager 75 is shown supporting an IGT coin handling feature 411, an IGT printer feature 413, and an IGT mechanical reels feature 415 in the IGT vendor-specific class 405. The present invention is not limited to features shown in FIG. 2 and the USB device class manager 75 may support other features 417.

The numbers of features supported by the IGT vendor specific class are generally not static. As new USB gaming peripherals are manufactured or the functions of an existing USB gaming peripheral are modified, additional features may be added to the IGT vendor specific class supported by the USB device class manager 75. The class is designed such that when new features are added to a class, the basic architecture of the class remains unchanged. All that is required is the addition of a new driver that supports the feature or the identification of an existing driver that supports the feature.

Figure 3:
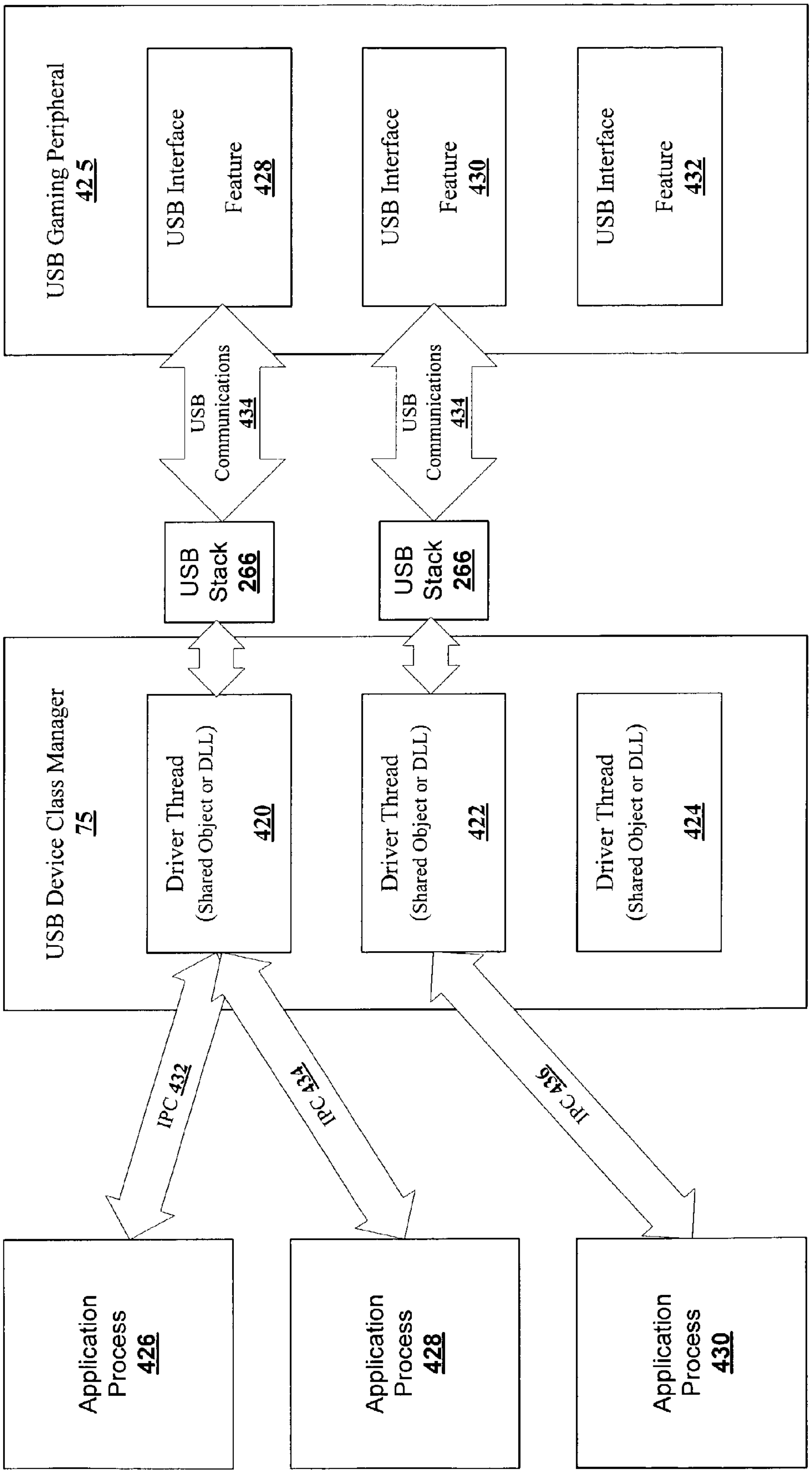
FIG. 3 is a block diagram showing communications between application processes and USB features via drivers managed by the USB device class manager.

FIG. 3 is a block diagram showing communications between application processes and USB features via drivers managed by the USB device class manager. As described with respect to FIG. 1C, the USB device class manager 75 process determines which USB drivers to load and run. USB drivers that drive a particular USB feature may also be referred to as a USB feature driver in the present invention. The USB drivers, such as 420, 422, and 424, may communicate directly with USB peripherals that are connected to the gaming machine, such as 425. In other words, they communicate using a USB protocol to the peripherals. The drivers also interface with the gaming system. The gaming system is the client of a USB driver. In FIG. 3, one embodiment of the host-peripheral relationship is described.

In this example, the USB device class manager 75 may load three DLLs (dynamic link libraries) or shared objects, 420, 422 and 424. A shared object is an object in the game OS that provides one or more particular functions. A program may access the functions of the shared object by creating either a static or dynamic link to the shared object. In this example, the USB device class manager has created dynamic links to the shared objects.

Typically, a USB shared object may have a specific function that corresponds to a certain peripheral feature, such as 428, 430 and 432. An example of a feature is the wheel component of a bonus peripheral. Another example is the lights component of a bonus peripheral. The concept of a peripheral feature is described in co-pending U.S. patent application Ser. No. 10/246,367, entitled “Protocols and Standards for USB Peripheral Communication,” previously incorporated herein. Details of peripheral features are also described with respect to FIGS. 7 and 8.

In this example which is provided for illustrative purposes only, the driver thread 420 communicates using USB with feature 428 of the USB gaming peripheral 425, the driver thread 422 communicates using USB with feature 430 of the USB gaming peripheral 425 and the driver thread 424 communicates using USB with feature 432 of the USB gaming peripheral 425. The driver threads are instantiations of the USB drivers by the game OS. The clients to each driver thread may vary with time as the gaming machine operates and generates different states on the gaming machine interface. In the current example, driver thread 420 has two clients, driver thread 422 has one client and driver thread 424 has zero clients. As described with respect to FIG. 1C, the USB device class manager 75 may monitor the clients of each driver thread. When a driver thread does not have any clients, the driver thread may be unloaded from memory. The USB device class manager 75, via its monitoring algorithms, may trigger the loading and the unloading of the drivers from memory.

In one embodiment, the client processes may communicate with the shared objects via inter process communications (IPCs). Application process 426 and application process 428 communicate with driver thread 420 via IPCs, 432 and 434 respectively. Application process 430 communicates via IPC 436 with driver thread 422. The present invention is not limited to IPCs and other communication mechanisms supported by the operating system may be used between two processes or logical entities executed by the gaming machine.

The USB gaming peripheral in this example may be viewed as a complex USB peripheral. A complex peripheral refers to a peripheral that has multiple USB interfaces. In other words, the peripheral is divided into several components. Each component or feature exists in its own USB interface. Please refer to the Universal Serial Bus Specifications found at www.usb.org for additional information on USB interfaces. Further details of USB features and interfaces are also described with respect to FIGS. 7 and 8. This example shows a USB gaming peripheral with a plurality of interfaces and features, connected to the USB host in a gaming machine. The invention may also support a plurality of USB gaming peripherals with a plurality of interfaces, connected to the same USB host in a gaming machine.

In order to communicate with a peripheral feature, the shared object registers with the USB stack 266, instantiated as a separate shared process in this embodiment, on the host machine. The USB stack mediates communication between the shared object and the peripheral feature. The USB stack may also provide basic USB communications that are compatible with the USB protocol.

The USB device class manager 75 may load the shared object at a time of its choosing. The shared object may be loaded at initialization time and may be always ready to interface with a peripheral feature, or it may also be loaded only when a USB gaming peripheral, with the appropriate feature, has just been connected. The decision on when to load the shared object may depend on memory constraints, frequency of access, speed of device enumeration, and necessity of driver availability.

The USB device class manager may generate a thread for every shared object it loads. Each thread has a channel that allows receipt of commands or requests from clients in the system. The requests may be in the form of an inter-process communication (IPC). Each thread may also be allowed to post events to the system. Depending on the function of the shared object, the thread may also allow a client to register a connection ID with the driver so that a pulse may be sent back to the client when a specified condition is satisfied. Lastly, the thread may establish a connection with the USB stack 266, enabling the thread to communicate directly with a peripheral feature. The attributes of the thread collectively allow the thread to function as a USB driver. In general, the USB device class manager 75 may manage a plurality of threads, with designated threads functioning as a USB driver where the number of threads may vary with time.

Figure 4:
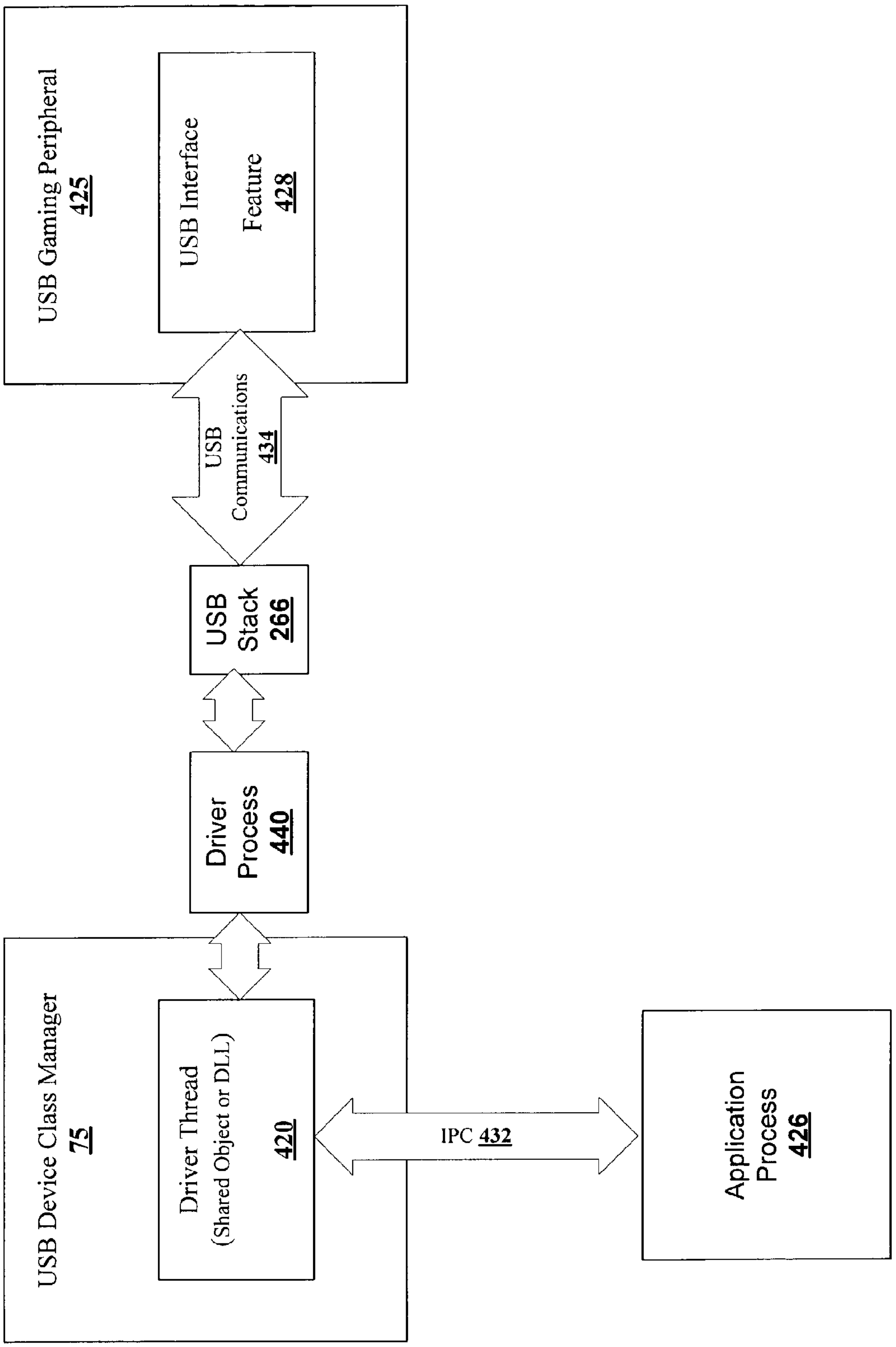
FIG. 4 is a block diagram showing communications between application processes and USB features via a third party driver managed by the USB device class manager.

FIG. 4 is a block diagram showing communications between application processes and USB features via a device driver process 440 managed by the USB device class manager 75. In the figure, another relationship between a host and a USB gaming peripheral is illustrated. Some functions of the USB gaming peripheral 425, the USB interface with feature 428, the client application process 426 and USB device class manager 75 were previously described in FIG. 3. One difference in FIG. 4 as compared to FIG. 3 is the introduction of a device driver process 440 that interfaces a shared object thread 420 to the USB gaming peripheral 425.

In this embodiment, the shared object driver 420, loaded by USB device class manager 75, may communicate with the driver process 440, but not directly with the USB gaming peripheral 425. The USB device class manager 75 launches the device driver process 440. As previously described, the USB device class manager 75 determines which USB communication processes run in the system. Only approved processes are allowed to run.

The driver process 440 may communicate with the USB gaming peripheral using either a standard USB class specification or a vendor-specific class specification. The driver process 440 may or may not be written by a third party company. The driver process 440 may communicate with multiple similar USB gaming peripherals. The details of the class specification implemented by the device driver process 400 may not be exposed to the shared object driver 420 running in the USB device class manager process 75. Instead, the driver process 440 may expose a different interface that the shared object driver 420 understands and uses. An example of such an interface could be a POSIX file system interface.

This design accommodates drivers that do not expose an interface that is understood by the gaming system. A client in the gaming system talks to a driver through an agreed upon interface. This driver process may not always be able to provide this interface, especially when a third-party company writes the driver process. Hence, there is a need, which is met by the present invention, to have a shared object driver that understands the interface to the driver process and translates the data in a meaningful way that is understood by clients.

Figure 5:
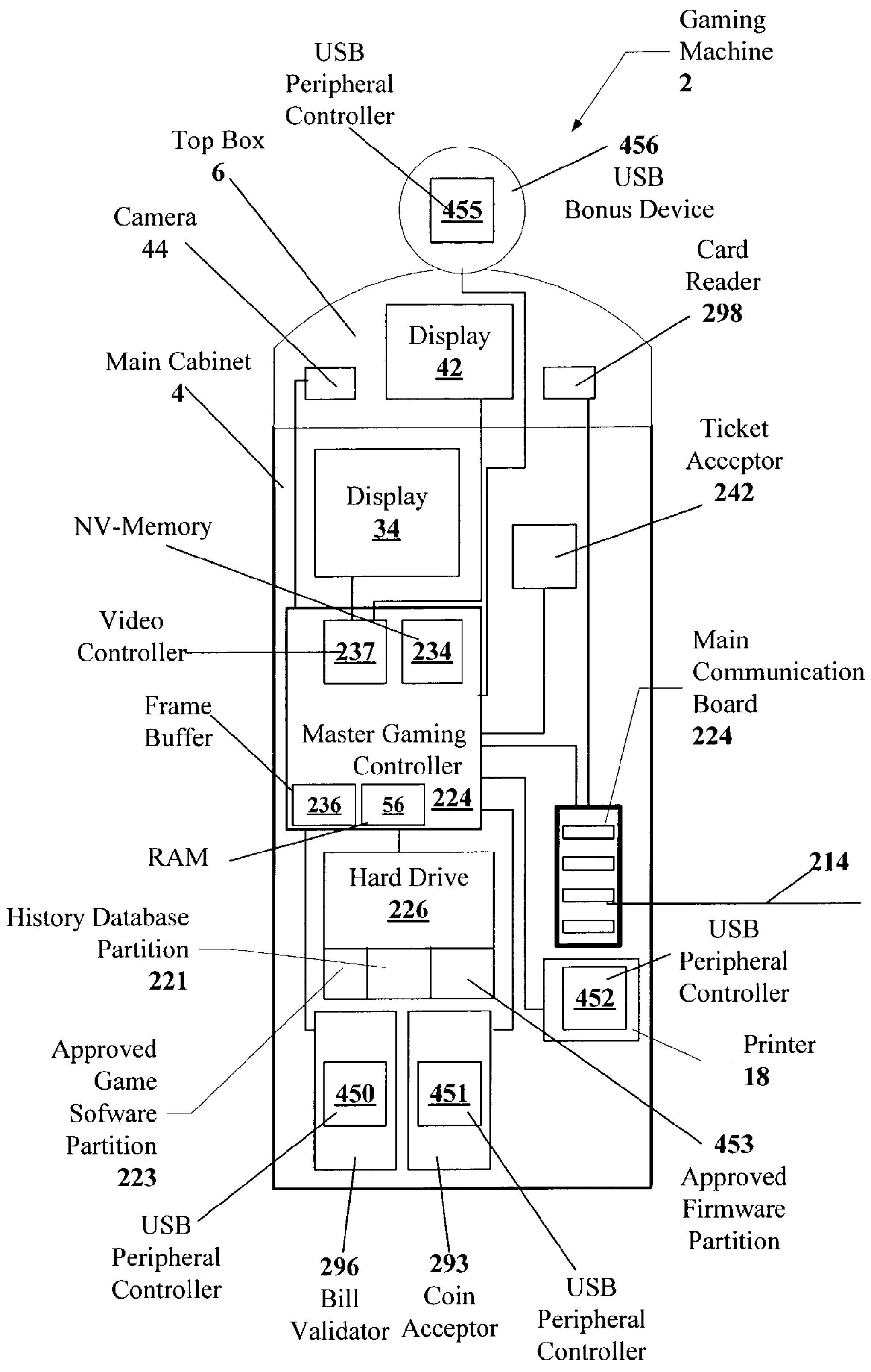
FIG. 5 is block diagram of a gaming machine with a master gaming controller and a plurality of gaming devices.

FIG. 5 is a block diagram of a gaming machine 2 of the present invention. A master gaming controller 224 controls the operation of the various gaming devices and the game presentation on the gaming machine 2. The master gaming controller 224 may communicate with other remote gaming devices, such as remote servers, via a main communication board 213 and network connection 214. The master gaming controller 224 may also communicate other gaming devices via a wireless communication link (not shown). The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, WiFi, and HomeRF.

Using gaming software and graphic libraries stored on the gaming machine 2, the master gaming controller 224 generates a game presentation, which may be presented on the display 34, the display 42 or combinations thereof. Alternate displays, such as mechanical slot reels that are USB-compatible, may also be used with the present invention. The game presentation is typically a sequence of frames updated at a specified refresh rate, such as 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

The gaming software for generating the gaming of chance may be stored on a mass storage device, such as the partitioned hard-drive 226, a CD, a DVD, etc. The approved gaming software may be loaded into a RAM 56 by the master gaming controller 224 for execution by one or more processors. The partitioned hard-drive 226 may include a partition 223 for approved gaming software and a partition for approved firmware 453. The approved gaming software and approved firmware may be approved by one or more entities, such as one or more gaming jurisdictions, a gaming machine manufacturer, a third party developer, a standards association, a gaming software development consortium and combinations thereof. The gaming software and firmware may be regularly updated via methods, such as downloads to the gaming machine from a remote device, such as a remote server or a remote gaming machine, or by replacing a storage device in the gaming machine, such as a CD or DVD, with a new storage device containing updated software or firmware.

In one embodiment, all the firmware or software used to operate one or more gaming peripherals, such as but not limited to the bill validator 269, the coin acceptor and the peripheral controller may be stored on the hard drive 226. The gaming peripherals may include software/firmware to establish basic communications with the master gaming controller. For instance, the bill validator 296, the coin acceptor 293, the printer 18, the USB bonus device 456 each respectively include a USB peripheral controller, 450, 451, 452 and 455. The USB-compatible peripheral controllers may be able to establish USB communications with the master gaming controller 224 by connecting with the USB stack described with respect to FIG. 1C. However, the USB-compatible peripheral controllers may not store the firmware or gaming software necessary to operate the peripheral devices on the gaming peripherals. Details of the USB-compatible peripheral controllers are described in co-pending U.S. application Ser. No. 10/246,367, previously incorporated herein.

Device drivers, such as USB-compatible drivers, may be used by the master gaming controller 224 to operate the functions of the gaming peripherals. The device drivers may be packaged with a game of chance implemented on the gaming machine. Each game may only be packaged with the drivers needed to generate the game on the gaming machine. For example, if a game requires a bonus top box with a wheel and lights, the drivers are packaged with the game rather than with the gaming system (see FIG. 1C). Therefore, extra drivers not employed by a particular game generated on the gaming machine are not loaded on the gaming machine.

After USB communications are established between a USB peripheral controller on a gaming peripheral, such as the USB peripheral controller 455 on the bonus device 456, and the master gaming controller 224, the master gaming controller 224 may interrogate each of the gaming peripherals to determine if the gaming peripherals requires firmware. The master gaming controller 224 may interrogate each device as part of a device enumeration process. When the master gaming peripheral determines a gaming peripheral requires firmware, then master gaming controller may request additional information from the gaming peripheral and/or peripheral devices on the gaming peripheral to determine what firmware is required. For instance, the master gaming controller 224 may query the USB-compatible peripheral controller 455 for one or more device identifiers in a device identification protocol that allows the type of firmware for each peripheral device requiring firmware to be determined.

The firmware downloaded to a gaming peripheral may be a function of the device characteristics (manufacturer, type of device, etc.), the gaming jurisdiction where the device is located (i.e., certain functions may only be allowed in certain jurisdictions) and the properties of the game of chance of generated on the gaming machine. For example, certain features on peripheral devices, such as a light peripheral device or a bonus wheel peripheral device, may be associated with a particular type of game of chance or bonus game of chance played on the gaming machine. Therefore, the master gaming controller may determine what type of game of chance or bonus game of chance is enabled on a gaming machine and load firmware that allows the particular presentation features of the game of chance and/or bonus games to be generated on the gaming machine interface. An advantage of this approach is that the presentation features of the gaming machine interface may be continually and easily updated to keep pace with the changing tastes of game players.

After determining what firmware is required for a given gaming peripheral or a peripheral device, the approved firmware may be downloaded by the master gaming controller 224 from a storage device on the gaming machine, such as the hard-drive 226. In response to receiving the downloaded firmware, the gaming peripheral may perform a number of self-checks to determine if the proper software has been downloaded and the peripheral device is operating properly. When the gaming peripheral is operating properly, it may send a status message to the master gaming controller indicating its operational status, such as a "ready-to-run" message or an "error" message.

In one response to an error message, the download process may be repeated by the master gaming controller 224. In another error scenario, a portion of the functions of one or more peripheral devices on a gaming peripheral may be non-operational. In this case, the master gaming controller 224 may determine if the non-operational function is a critical function. When the non-operational function is a critical function, the gaming machine may be placed in a non-operational state and an attendant may be called. When the non-operational function is non-critical, for example, lights on a bonus device that are non-operational, the gaming machine software may be adjusted to operate without the non-critical function and a request for maintenance may be generated by the gaming machine. For example, in the case of the lights not working, alternate presentation state logic may be loaded that generates presentation states on the gaming machine interface that do not use the non-operational lights.

As previously described, a gaming peripheral, such as USB gaming peripheral, may comprise a plurality of peripheral devices. On a gaming peripheral with a 30 plurality of peripheral devices, not all of the peripheral devices may require firmware downloads. The peripheral controller on a gaming peripheral may store firmware for a portion of the peripheral devices in a non-volatile memory and require firmware downloads for the remaining peripheral devices. In one embodiment, firmware downloaded from the master gaming controller may only be stored in volatile memory on the peripheral device. In the case where the peripheral controller stores firmware for one or more of its peripheral devices in a non-volatile memory and a download is not required to operate the peripheral device, the master gaming controller may occasionally download firmware to update or provide error patches for the firmware/software stored in the non-volatile memory.

In another embodiment, the firmware downloaded to the gaming peripheral may not be peripheral device specific. For instance, the master gaming controller 224 may download common firmware needed by the gaming peripheral to communicate gaming information with the master gaming controller. The common firmware may include basic communication logic, such as communication protocols and encryption keys that allow the gaming peripheral to communicate with certain processes in gaming operating system. Without the common firmware, the gaming peripheral may be able to only establish basic communications with the gaming machine but not receive or send basic gaming information to the gaming system.

For security purposes, the master gaming controller 224 may, regularly change the encryption keys used in the gaming system. For instance, each time a gaming peripheral is enumerated by the master gaming controller, it may be provided with an encryption key that is valid for communications with one or more processes on the master gaming controller for a certain period of time. The keys may be used to encrypt messages or create a digital signature that is appended to a message. In one embodiment, the keys may be process and device specific. Thus, only peripheral device with the correct key may be able to communicate with certain processes on the gaming machine, such as the bank manager. The encryption keys may be included in firmware downloaded to the gaming peripheral and may have to be reestablished at regular time intervals.

The firmware downloads to the gaming peripherals may occur at different times. For instance, the firmware downloads may occur 1) in response to power-up of the gaming machine or the peripheral device, 2) in response to enumeration of a new gaming peripheral on the gaming machine, 3) in response to the loading of a new game on a gaming machine, 4) in response to a software update, 5) in response to random triggers, such as random time period for security, and 6) combinations thereof. The firmware downloads may be carried out for a plurality of peripheral devices, such as at power-up, or for individual devices, such as during the enumeration of a new peripheral device.

After initialization, communications between the gaming peripherals, such as 293, 396 and 18, and the master gaming controller 224, may be encrypted. All or a portion of the communications may be encrypted. For instance, data from the coin acceptor 293 that indicates credit has been posted to the gaming machine may be encrypted to prevent tampering. The encryption may be carried out using a combination of hardware and software. For example, in one embodiment, encryption chips may be utilized by certain devices, such as the bill validator 296 and the coin acceptor 239, and the master gaming controller 224 to provide secure communications. In another embodiment, software encryption algorithms may be applied to transmitted data. Thus, the gaming peripherals and the master gaming controller 224 may both utilize software that provides for encryption and decryption of transmitted data.

After all of the gaming peripherals comprising the gaming machine interface have been initialized, a game presentation may be generated. In one embodiment, a video game presentation comprising a sequence of video frames may be generated. Each frame in the sequence of frames in a game presentation is temporarily stored in a video memory 236 located on the master gaming controller 224 or alternatively on the video controller 237, which may also be considered part of the master gaming controller 224. The gaming machine 2 may also include a video card (not shown) with a separate memory and processor for performing graphic functions on the gaming machine, such as 2-D renderings of 3-D objects defined in a 3-D game environment stored on the gaming machine.

Typically, the video memory 236 includes 1 or more frame buffers that store frame data that is sent by the video controller 237 to the display 34 or the display 42. The frame buffer is in video memory directly addressable by the video controller. The video memory and video controller may be incorporated into a video card, which is connected to the processor board containing the master gaming controller 224. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 223 of the hard drive 226, on a CD-ROM or some other storage device may be streamed to the displays 34 and 42 as part of game presentation. Thus, the game presentation may include frames graphically rendered in real-time using the graphics libraries stored on the gaming machine as well as pre-rendered frames stored on the gaming machine 2.

For gaming machines, an important function is the ability to store and re-display historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage 234 on the gaming machine and displayed in some manner to a display on the gaming machine. In some embodiments, game history information may also be stored in a history database partition 221 on the hard drive 226. The hard drive 226 is only one example of a mass storage device that may be used with the present invention. The game history information is used to reconcile the dispute.

During the game presentation, the master gaming controller 224 may select and capture certain frames to provide a game history. These decisions are made in accordance with particular game code executed by the controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 224.

Various gaming software modules used to play different types of games of chance may be stored on the hard drive 226. Each game may be stored in its own directory to facilitate installing new games (and removing older ones) in the field. To install a new game, a utility may be used to create the directory and copy the necessary files to the hard drive 226. To remove a game, a utility may be used remove the directory that contains the game and its files. In each game directory there may be many subdirectories to organize the information. Some of the gaming information in the game directories are: 1) a game process and its associated gaming software modules, 2) graphics/Sound files/Phrase(s), 3) a paytable file and 4) a configuration file. A similar directory structure may also be created in the NV-memory 234. Further, each game may have its own directory in the non-volatile memory file structure to allow the non-volatile memory for each game to be installed and removed as needed.

On boot up, the game manager (see FIG. 1C) or another process in the game OS can iterate through the game directories on the hard drive 226 and detect the games present. The game manager may obtain all of its necessary information to decide which games can be played and how to allow the user to select one (multi-game). The game manager may verify that there is a one to one relationship between the directories on the NV-memory 234 and the directories on the hard drive 226. Details of the directory structures on the NV-memory and the hard drive 226 and the verification process are described in co-pending U.S. application Ser. No. 09/925,098, filed on Aug. 8, 2001, by Cockerille, et al., titled "Process Verification," which is incorporated herein in its entirety and for all purposes.

Figure 6:
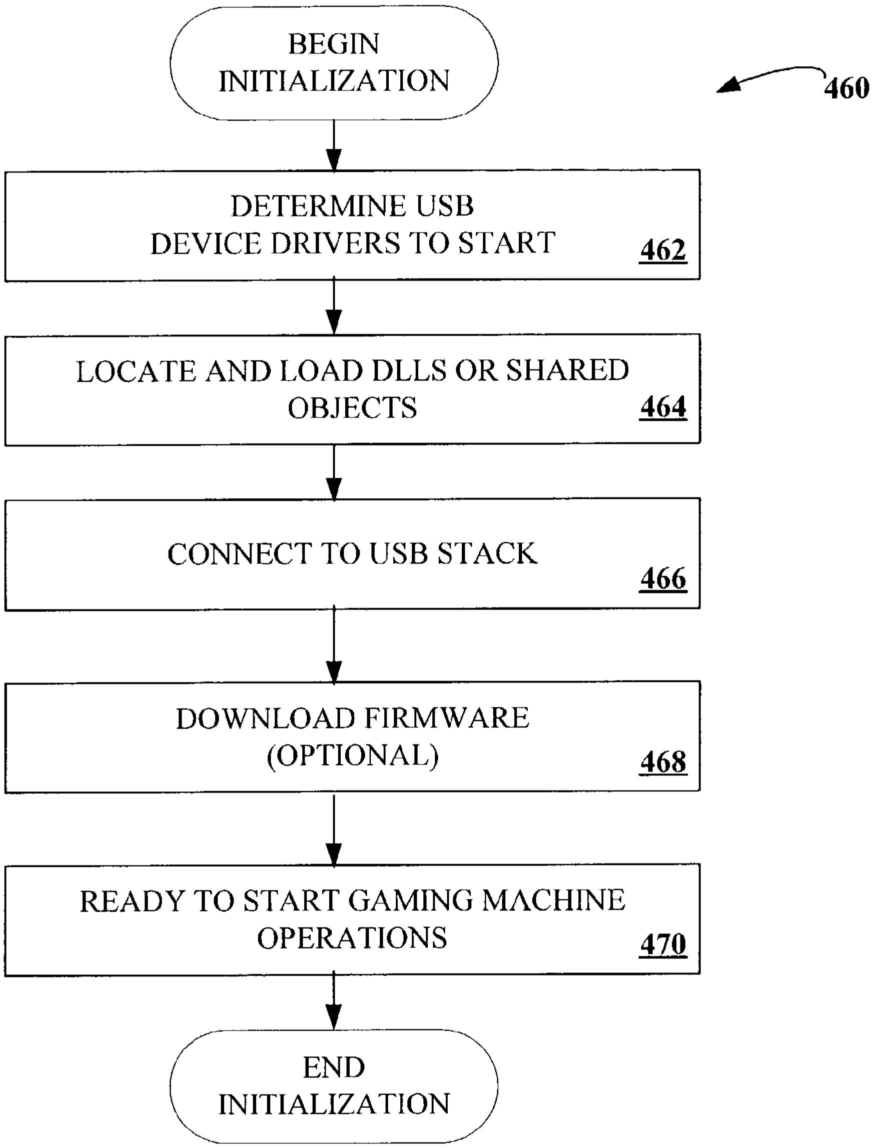
FIG. 6 is flow diagram of an initialization process in a USB device class manager.

FIG. 6 is flow diagram of an initialization process 460 using a USB device class manager. In 462, the USB device class manager reads a registry file and launches the driver processes that have been approved. These processes are low-level drivers that have to be started before other drivers run. An example of such a driver is the third-party driver referenced in FIG. 4.

In 464, the USB device class manager locates and loads the shared object drivers that communicate either with a driver process or directly with a USB peripheral. In one embodiment, only approved shared objects are packaged with the system. As previously described, the shared objects may be approved by one or more entities, such as a regulators from one or more gaming jurisdictions, a gaming machine manufacturer, a third party vendor or a third party standards group.

In 464, to locate the needed shared objects, the USB device class manager may perform a search of relevant paths in a file directory system maintained by the game OS and may retrieve all necessary information from the shared object drivers. Among the information retrieved is a list of all approved gaming peripherals that are approved for connection to the gaming machine. In one embodiment, only approved gaming peripherals, for the jurisdiction where the machine is in operation, may be on this list. In a particular embodiment, the list may not only designate approved gaming peripherals but also designate approved peripheral devices or approved operational features of peripheral devices located on the gaming peripheral.

In one embodiment, the gaming machine may be shipped with a plurality of lists that are compatible with different gaming jurisdictions. The gaming machine may be able to automatically identify the jurisdiction in which it has been placed (For instance, the gaming machine could connect to a local network server or this information might be manually set in the gaming machine.) Then, the gaming machine may be capable of selecting the list of approved gaming peripherals, peripheral devices and/or operational features that are approved for the gaming jurisdiction in which it is located.

If the gaming machine detects a gaming peripheral that is not on the list, the machine enters a non-playable state and notifies an attendant. This measure can prevent software for an illegal device from being planted on the hard-drive. In the standard USB architecture, any USB-compatible device may connect to a USB-compatible network. For security reasons, this level of connectivity may not be desirable in the gaming industry. Hence the need for the USB device class manager of the present invention.

The shared object drivers may be packaged with the system component or with the game component of the gaming files. An example of a shared object driver packaged with the system component is a bill validator driver. An example of a shared object driver packaged with the game component is a wheel driver for a bonus peripheral. This allows flexibility in the software configuration of the gaming machine. Further, it allows some shared objects (e.g., bill validator) to be loaded and ready for use after the initialization process, while other shared objects (e.g., the wheel driver) may be loaded when the need arises. For instance, the wheel driver may not be loaded until a process, such as a bonus game, requests use of the wheel driver. As described with respect to FIG. 1C, the USB device class manager may monitor client requests for the use of each of the drivers and determine when to load and unload each of the drivers.

In 466, the USB device class manager may connect to the USB stack and may retrieve information on all of the USB peripherals that are connected to the gaming machine. When peripherals that are not approved are detected, the gaming machine may enter a non-playable state and an attendant may be notified. The gaming machine may remain in the non-playable state until the issue with these non-approved peripherals is resolved. For approved peripherals that are detected, if a shared object driver has not been loaded yet, it may be loaded at this time. In general, a USB gaming peripheral may perform like a plug-and-play device, where it may be connected or disconnected at any time. In one embodiment, the USB device class manager may allocate memory only for devices that are present. This memory allocation process may promote efficient use of system memory.

In 468, upon detection of one or more gaming peripherals, the USB device class manager may find a peripheral that is in need of firmware download. In one embodiment as described in more detail with respect to FIG. 5, the USB gaming peripheral may function only as a downloadable device and may require firmware download before it is capable of functioning as a specific gaming peripheral, e.g. bill validator. This feature may provide additional security because the gaming machine has approved working firmware for the peripheral while the peripheral does not. The gaming machine may centrally manage the approved firmware in a secure manner. The objective of this approach is to guarantee that the peripheral is running approved firmware while the gaming machine is in operation.

In 468, the USB device class manager may initiate the download procedure through a shared object driver. Once the firmware download process is completed for all peripherals that require download, in 470, the USB device class manager may leave its initialization state and may enter state compatible with normal run-time operations.

During normal run-time operations, the USB device class manager may continue to load or unload shared object drivers, as necessary. For gaming-specific peripherals, the USB class manager may implement various security measures to ensure that the gaming peripheral is not compromised. One such measure may be the implementation of host timeout. In the host timeout method, the peripheral may be required to receive polls from the host within a timeout period. If the host fails to poll within the timeout period, the peripheral may be designed to enter a safe state where no monetary claim can be made on the machine or the gaming peripheral.

Another security measure may be the use of cryptography in the messages between host and peripheral. As previously described with respect to FIG. 5, the USB device class manager may assign cryptographic keys to each of the gaming peripherals during the initialization process. For instance, the device class manager may exchange public encryption keys with each gaming peripheral in a public-private encryption key scheme. In another embodiment, random symmetric encryption keys may be generated and assigned to each gaming peripheral. During run-time, the encryption keys for each gaming peripheral may be regularly changed by the USB device class driver at regular or random time intervals, i.e., new keys are assigned to each gaming peripheral, as an additional security measure. The encryption keys may be used in sensitive transactions between a peripheral and the host to encrypt and decrypt sensitive data.

The USB device class manager may also provide CRC verification or other hashing function verification of peripheral firmware. For instance, the USB device class manager may request the gaming peripheral to generate a CRC of all of its firmware or a random section of its firmware. This CRC may be compared with a CRC of approved firmware stored on the gaming machine (e.g., see the hard-drive 226 in FIG. 5). This method may be used to ensure that the peripheral is running proper firmware at all times.

The USB device class manager may also support firmware downloads as a means of upgrading firmware on a USB peripheral or the approved firmware stored on the gaming machine. The download request may originate from an operator working on the gaming machine, or from other sources, such as a host system, to which the gaming machine is connected. In another embodiment, the gaming machine may automatically check for software upgrades available on a remote server and initiate any needed upgrades. The firmware download procedure may be similar to the procedure described above. In one embodiment, the gaming peripheral may store the new firmware in non-volatile memory and operate with this firmware until the next upgrade.

Figure 7:
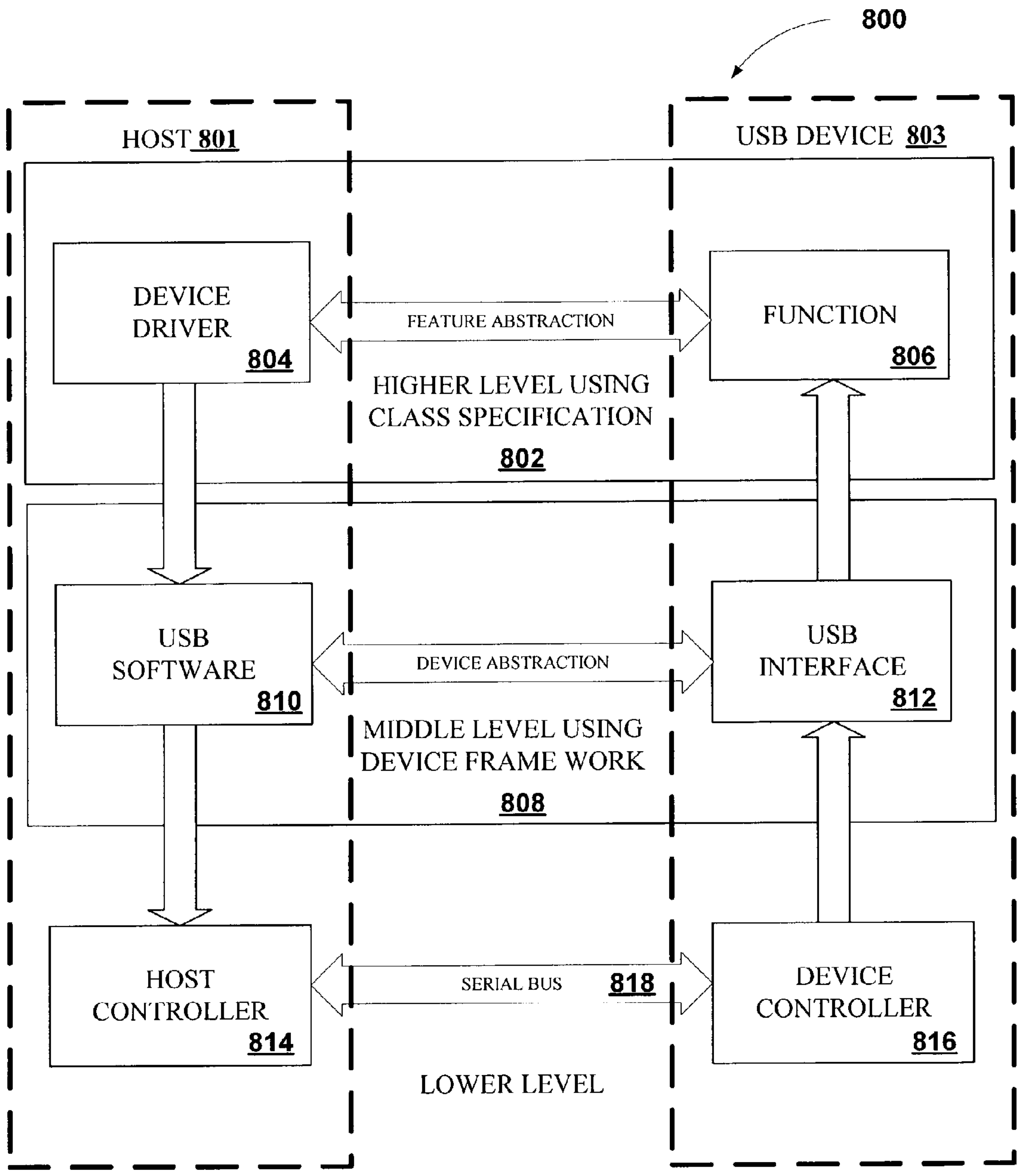
FIG. 7 is a block diagram of a USB communication architecture that may be used to provide USB communications in the present invention.

FIG. 7 is a block diagram of a USB communication architecture 800 that may be used to provide USB communications in the present invention. A USB device 803 may be subdivided into a number of components, such as device, configuration, interface and endpoint. Class specifications define how a device uses these components to deliver the functionality provided to the host system. The class specifications may vary from class to class. In some cases, the class specifications are standards that are maintained by USB user group organization and have been subjected to a review and approval process by the USB user group. For instance, a USB HID (Human interface device) class is a standard USB class. In other cases, the class specifications may be a vendor-specific class that has been developed by a vendor to meet the specific needs of a vendor. It is important to note that USB provides a framework for generating the class specification but that the actual implementation of the class specification may be a unique embodiment that is generated the developer or developers of the class specification.

In some cases a host system uses device-specific information in a device or interface descriptor to associate a device with a driver, such as a device identification protocol. The standard device and interface descriptors contain fields that are related to classification: class, subclass and protocol. These fields may be used by a host system to associate a device or interface to a driver, depending on how they are specified by the class specification. Embodiments of a USB-compatible device identification protocol is described in co-pending U.S. application Ser. No. 10/460,826, filed on Jun. 11, 2003 and titled "Protocols and Standards for USB Peripheral Communications," by Quraishi, et al., previously incorporated herein. Another embodiment of a USB-compatible device identification protocol is described in co-pending U.S. application Ser. No. 10/246,367, entitled "USB Device Protocol for a Gaming Machine," previously incorporated herein.

The relationships between a USB device 803 and a host system 801 may be described according to a number of levels. At the lowest level, the host controller 814 physically communicates with the device controller 816 on the USB device 803 through USB 818. Typically, the host 801 requires a host controller 814 and each USB device 800 requires a device controller 816.

At the middle layer, USB system software 810 may use the device abstraction defined in the Universal Serial Bus Specification to interact with the USB interface 812 on the USB device. The USB interface is the hardware (such as firmware) or software, which responds to standard requests and returns standard descriptors. The standard descriptors allow the host system 801 to learn about the capabilities of the USB device 803. The Universal Serial Bus Specification provides the device framework 808, such as the definitions of standard descriptors and standard requests. These communications are performed through the USB stack described with respect to FIG. 1C.

At the highest layer the device driver 804 uses an interface abstraction to interact with the function provided by the physical device. The device driver 804 may control devices with certain functional characteristics in common. The functional characteristics may be a single interface of a USB device or it may be a group of interfaces. In the case of a group of interfaces, the USB device may implement a class specification. If the interface belongs to a particular class, the class specification may define this abstraction. Class specifications add another layer of requirements directly related to how the software interacts with the capability performed by a device or interface which is a member of the class. The present invention may use a USB gaming peripheral class specification that is vendor-specific that may be used to provide USB communications in a gaming machine. The vendor-specific class may be defined to meet the specific needs of USB communications on a gaming machine, such as security requirements, that are not provided by other standard USB device classes.

A USB class describes a group of devices or interfaces with similar attributes or services. The actual definition of what constitutes a class may vary from one class to another. A class specification, such as gaming peripheral class specification, defines the requirements for such a related group. A complete class specification may allow manufacturers to create implementations, which may be managed by an adaptive device driver. A class driver is an adaptive driver based on a class definition. An operating system, third party software vendors as well as manufacturers supporting multiple products may develop adaptive drivers.

Typically, two devices (or interfaces) may be placed in the same class if they provide or consume data streams having similar data formats or if both devices use a similar means of communicating with a host system. USB classes may be used to describe the manner in which an interface communicates with the host, including both the data and control mechanisms. Also, USB classes may have the secondary purpose of identifying in whole or in part the capability provided by that interface. Thus, the class information can be used to identify a driver responsible for managing the interface's connectivity and the capability provided by the interface.

Grouping devices or interfaces together in classes and then specifying the characteristics in a class specification may allow the development of host software which can manage multiple implementations based on that class. Such host software may adapt its operation to a specific device or interface using descriptive information presented by the device. The host software may learn of a device's capabilities during the enumeration process for that device. A class specification may serve as a framework for defining the minimum operation of all devices or interfaces which identify themselves as members of the class.

Returning to FIG. 7, in the context of USB architecture 800, the term "device" may have different meaning depending on the context in which it is used. A device in the USB architecture may be a logical or physical entity that performs one or more functions. The actual entity described depends on the context of the reference. At the lowest level, a device may be a single hardware component, such as a memory device. At a higher-level, a device may be a collection of hardware components that perform a particular function, such as a USB interface device. At an even higher-level, the term "device" may refer to the function 806 performed by an entity attached to the USB, such as a display device. Devices may be physical, electrical, addressable, or logical. Typically, when used as a non-specific reference, a device is either a hub or a function 806. A hub is a USB device that provides attachment points to the USB.

A typical USB communication path may start with a process executed on a host system, which may wish to operate a function of a physical device. The device driver 804 may send a message to the USB software 810. The USB software may operate on the message and send it to the host controller 814. The host controller 814 may pass the message through the serial bus 818 to the hardware 816. The USB interface may operate on the message received from the hardware and route it to a target interface which may route information to the physical device, which performs the desired operation.

USB changes the traditional relationship between driver and device. Instead of allowing a driver direct hardware access to a device, USB limits communications between a driver and a device to four basic data transfer types (bulk, control, interrupt and isochronous) implemented as a software interface provided by the host environment. Thus, a device must respond as expected by the system software layers or a driver will be unable to communicate with its device. For this reason, USB-compatible classes, such as an HID class 401, printer class 403, IGT vendor-specific class 405, and an audio class 407 (see FIG. 2), are based at least on how the device or interface connects to USB rather than just the attributes or services provided by the device.

As an example, a class may describe how a USB gaming peripheral is attached to a host system, either as a single unidirectional output pipe or as two unidirectional pipes, one out and one in, for returning detailed gaming peripheral status. The gaming peripheral class may also focus on the format of the data moved between host and device. While raw (or undefined) data streams may be used, the class may also identify data formats more specifically. For instance, the output (and optional input) pipe may choose to encapsulate gaming peripheral data as defined in another industry standard, such as a SAS protocol used by IGT (Reno, Nev.). The class may provide a mechanism to return this information using a class-specific command.

Figure 8:
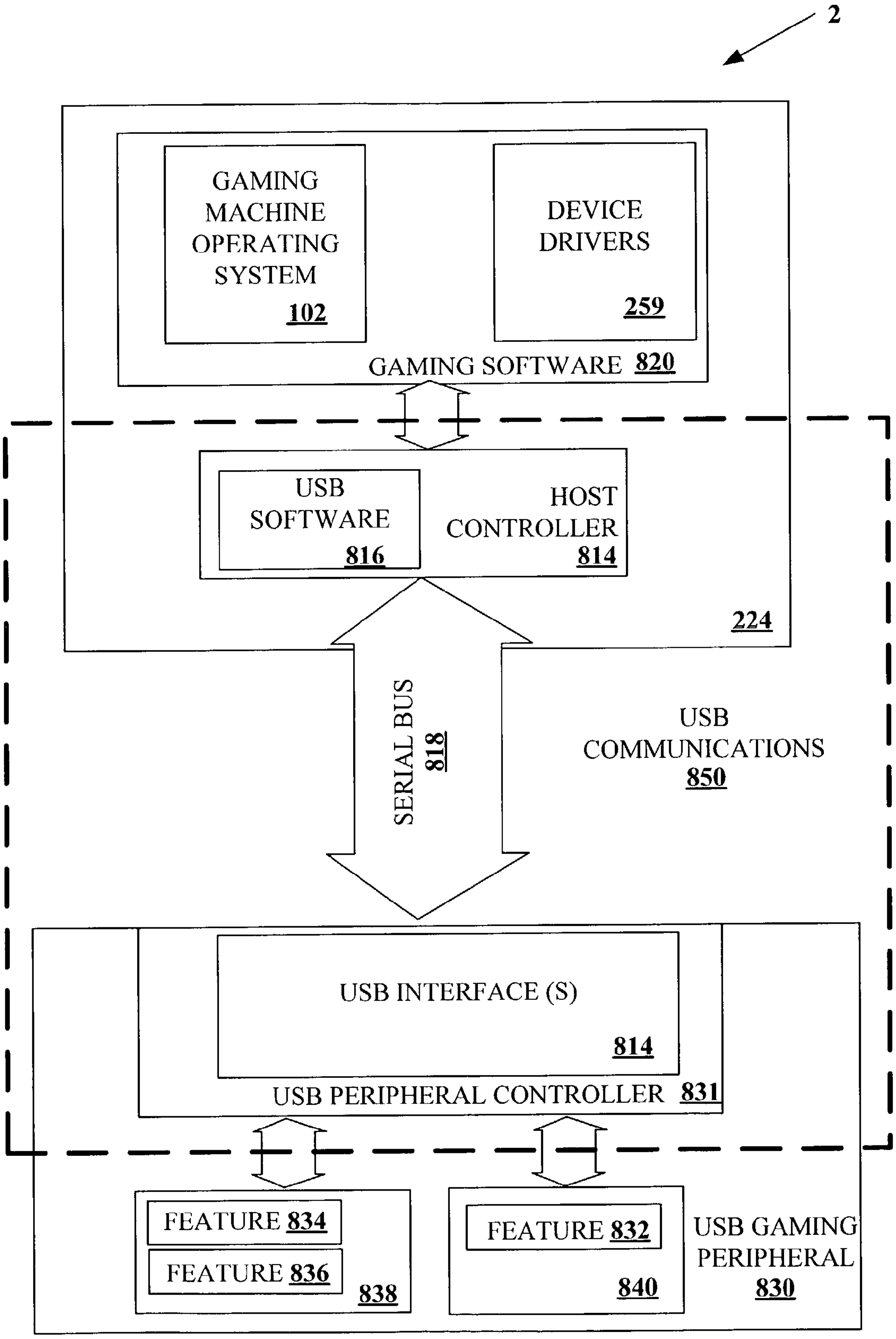
FIG. 8 is a block diagram of master gaming controller in communication with a USB gaming peripheral.

FIG. 8 is a block diagram of master gaming controller 224 in communication with a USB gaming peripheral 830. The master gaming controller 224 may be and isochronous) implemented as a software interface provided by the host environment. Thus, a device must respond as expected by the system software layers or a driver will be unable to communicate with its device. For this reason, USB-compatible classes, such as an HID class 401, printer class 403, IGT vendor-specific class 405, and an audio class 407 (see FIG. 2), are based at least on how the device or interface connects to USB rather than just the attributes or services provided by the device.

As an example, a class may describe how a USB gaming peripheral is attached to a host system, either as a single unidirectional output pipe or as two unidirectional pipes, one out and one in, for returning detailed gaming peripheral status. The gaming peripheral class may also focus on the format of the data moved between host and device. While raw (or undefined) data streams may be used, the class may also identify data formats more specifically. For instance, the output (and optional input) pipe may choose to encapsulate gaming peripheral data as defined in another industry standard, such as a SAS protocol used by IGT (Reno, Nev.). The class may provide a mechanism to return this information using a class-specific command.

FIG. 8 is a block diagram of master gaming controller 224 in communication with a USB gaming peripheral 830. The master gaming controller 224 may be considered a host 801 with hardware and software functionality as was described with respect to FIG. 7. The USB gaming peripheral 830 may be considered to have USB device hardware and software functionality as was described with respect to FIG. 7.

The master gaming controller 224 may use USB communication 850 to communicate with a number of peripheral devices, such as lights, printers, coin counters, bill validators, ticket readers, card readers, key-pads, button panels, display screens, speakers, information panels, motors, mass storage devices, touch screens, arcade sticks, thumbsticks, trackballs, touchpads and solenoids. Some of these devices were described with respect to FIGS. 1A and 5. The USB communication 850 may include the hardware and software, such as, but not limited to, the USB software 816, the host controller 814, the serial bus 818, USB interfaces 812, a USB peripheral controller 831 and a USB hub (not shown). The USB peripheral controller 831 may provide device controller functionality (see FIG. 7) for the USB gaming peripheral 830. The USB peripheral controller 831 may be an embodiment of the USB peripheral controllers described with respect to FIG. 5 and in co-pending U.S. application Ser. No. 10/246,367 previously incorporated herein.

The USB communication 850 may allow a gaming drivers 259, such as gaming feature drives and gaming class drivers, to be utilized by the gaming software class of the present invention. For example, a USB gaming peripheral 830 with two devices, such as buttons for input and lights for output, may have two features—buttons feature and lights feature. Corresponding gaming feature drivers in the gaming drivers 259 may control the buttons feature and the lights features. For instance, a gaming button feature driver may control the buttons feature and a gaming lights feature driver may control the lights feature via the USB communication 850.

The designation of the number of features in a gaming peripheral may be left to the manufacturer of the USB gaming peripheral. A manufacturer may divide a task that is performed by the peripheral into multiple features, as long as it makes sense for the peripheral to be viewed in software in that manner. The maximum number of features that are allowed on a single peripheral may be limited by the USB solution that is selected for the peripheral. In one embodiment, each feature may have its own interface.

In another embodiment, features may be specified according to the requirements of a class definition, such as a vendor-specific class protocol. An advantage of this approach is that drivers for common features, such as lights or reels, may be re-used. For instance, using this approach, lights located on a plurality of different gaming peripherals, where each of the peripherals may be produced by different manufacturers, may be driven by a common driver or a driver guaranteed to support a common set of functions. Once common drivers are developed and/or common functions supported by the drivers are defined, drivers may be re-used and may not have to be retested to satisfy one or more of regulatory requirements, reliability requirements and security requirements. This approach may significantly lower software development costs and enable third parties to reliably develop software for the gaming machine manufacturer.

Figure 9:
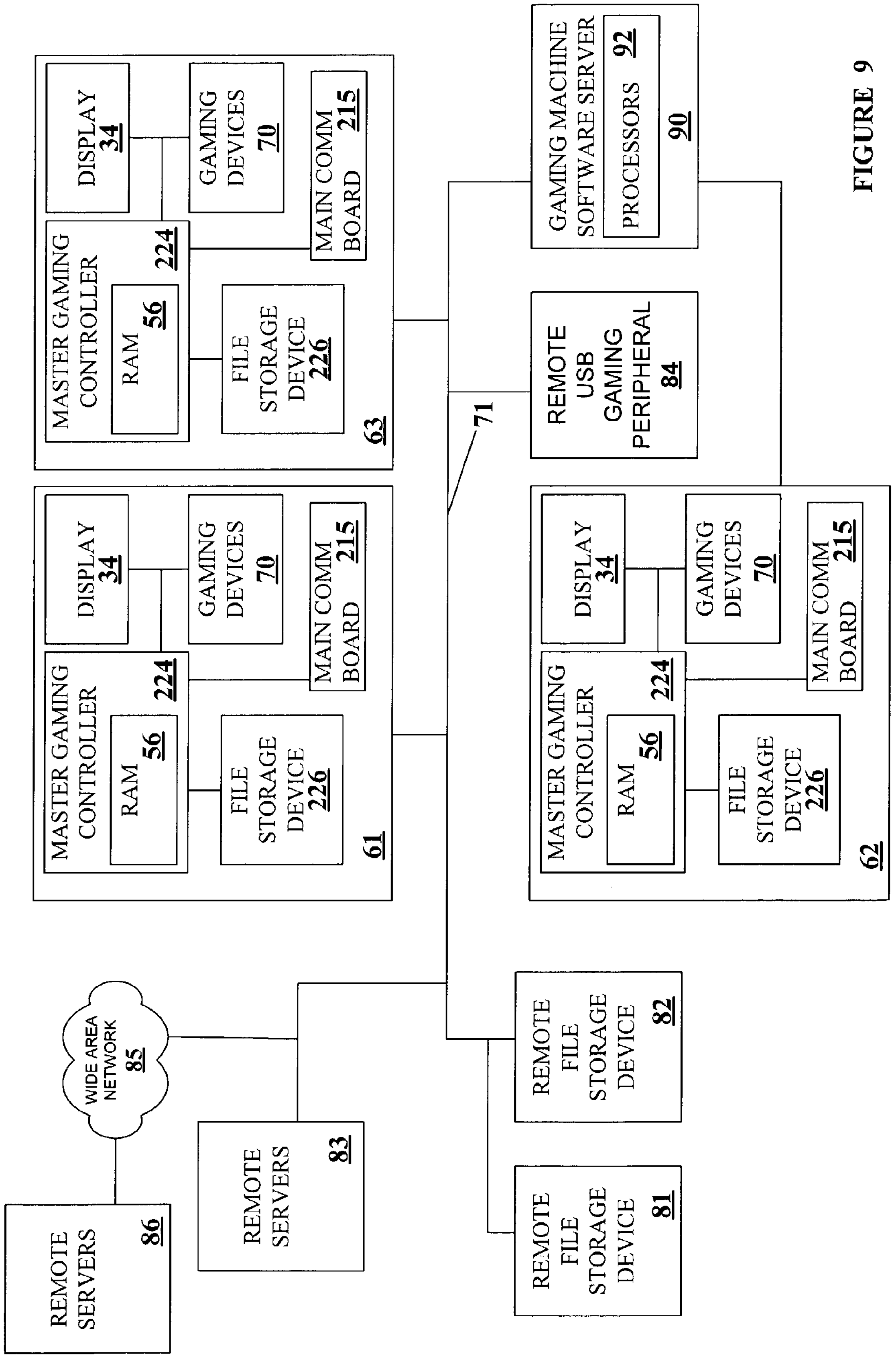
FIG. 9 is a block diagram of gaming system that utilizes distributed gaming software, distributed processors and distributed servers to generate a game of chance and provide gaming services.

FIG. 9 is a block diagrams of gaming machines in a gaming system that utilize distributed gaming software and distributed processors to generate a game of chance for one embodiment of the present invention. A master gaming controller 224 is used to present one or more games on the gaming machines 61, 62 and 63. The master gaming controller 224 executes a number of gaming software modules to operate gaming devices 70, such as coin hoppers, bill validators, coin acceptors, speakers, printers, lights, displays (e.g. 34) and other input/output mechanisms (see FIGS. 1 and 8). The gaming machine may also control features of gaming peripherals located outside of the gaming machine, such as the remote USB gaming peripheral 84. The gaming machines, 61, 62, and 63 may also download software/firmware to these gaming devices (e.g., 70 and 84). For USB communications and firmware downloads to the gaming devices 70 and 84, the USB device class manager of the present invention may be used.

The master gaming controllers 224 may also execute gaming software enabling communications with gaming devices including remote servers, 83 and 86, located outside of the gaming machines 61, 62 and 63, such as player-tracking servers, bonus game servers, game servers and progressive game servers. In some embodiments, communications with devices located outside of the gaming machines may be performed using the main communication board 213 and network connections 71. The network connections 71 may allow communications with remote gaming devices via a local area network, an intranet, the Internet, a wide area network 85 which may include the Internet, or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be located in 1) a file storage device 226 on gaming machine 61, 2) a remote file storage device 81, 2) a remote file storage device 82, 3) a game server 90, 4) a file storage device 226 on gaming machine 62, 5) a file storage device 226 on gaming machine 63, or 6) combinations thereof. In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof. For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection (e.g., 81, 82 and 90) or combinations thereof.

The game server 90 may be a repository for game software modules, gaming peripheral firmware and software for other game services provided on the gaming machines 61, 62 and 63. In one embodiment of the present invention, the gaming machines 61, 62 and 63 may download game software modules from the game server 90 to a local file storage device to play a game of chance or the game server may initiate the download. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server 90 might also be a dedicated computer or a service running on a server with other application programs.

In one embodiment of the present invention, the processors used to generate a game of chance may be distributed among different machines. For instance, the game flow logic to play a game of chance may be executed on game server 92 by processor 90 while the game presentation logic may be executed on gaming machines 61, 62 and 63 by the master gaming controller 224. The gaming operating systems on gaming machines 61, 62 and 63 and the game server 90 may allow gaming events to be communicated between different gaming software modules executing on different gaming machines via defined APIs. Thus, a game flow software module executed on game server 92 may send gaming events to a game presentation software module executed on gaming machine 61, 62 or 63 to control the play of a game of chance or to control the play of a bonus game of chance presented on gaming machines 61, 62 and 63. As another example, the gaming machines 61, 62 and 63 may send gaming events to one another via network connection 71 to control the play of a shared bonus game played simultaneously on the different gaming machines.

Although the foregoing invention has been described in some detail for purposes of clarity of understanding, it will be apparent that certain changes and modifications may be practiced within the scope of the appended claims. For instance, while the gaming machines of this invention have been depicted as having gaming peripherals physically attached to a main gaming machine cabinet, the use of gaming peripherals in accordance with this invention is not so limited. For example, the peripheral features commonly provided on a top box may be included in a stand along cabinet proximate to, but unconnected to, the main gaming machine chassis. As another example, the present invention is not limited to the gaming software architecture and USB communication architecture described above, and other gaming software and USB communication architectures may be compatible with the present invention.

What is claimed is:

1. A gaming machine comprising:

a master gaming controller configured to i) generate a game of chance played on the gaming machine by execution of a plurality of gaming software modules and ii) communicate with a plurality of USB (Universal Serial Bus) gaming peripherals using USB-compatible communications;

the plurality of USB gaming peripherals coupled to the gaming machine and in communication with the master gaming controller;

a gaming operating system on the master gaming controller configured to load gaming software modules into a Random Access Memory (RAM) to be executed from a storage device and further configured to unload gaming software modules from the RAM;

a USB device class manager loaded by the gaming operating system to configure a USB device interface wherein the USB device class manager is configured to:

i) authorize communication connections between each of the plurality USB gaming peripherals and the master gaming controller;

ii) receive information from each of the plurality of USB gaming peripherals that allows USB drivers associated with the plurality of USB gaming peripherals to be located;

iii) locate a first USB driver compatible to provide communications between the master gaming controller and a first USB gaming peripheral wherein the first USB driver allows the master gaming controller to control at least one function of the first USB gaming peripheral via a USB device interface for the first USB gaming peripheral;

iv) determine, prior to loading the first USB driver, whether the master gaming controller is authorized to control the at least one function of the first USB gaming peripheral, and further configured to access a list of approved USB gaming device interfaces, the list stored in the RAM, wherein the master gaming controller is authorized to control the at least one function when an entry that represents the USB device interface for the first USB gaming peripheral is present in the list of approved USB gaming device interfaces; and v) prevent communications using the first USB driver when the master gaming controller is not authorized to control the at least one function of the first USB gaming peripheral, and further configured to prevent the first USB driver from being loaded.

2. The gaming machine of claim 1, further comprising:

a USB stack loaded by the gaming operating system configured to provide a USB communication connection for each of the plurality of USB gaming peripherals to the USB device interface.

3. The gaming machine of claim 1, wherein the USB device class manager is further configured to download firmware to one or more of the USB gaming peripherals.

4. The gaming machine of claim 1, wherein the USB device class manager is further configured to search a file directory structure maintained by the gaming operating system to identify a list of USB drivers to be included in the USB device interface.

5. The gaming machine of claim 1, wherein the USB device class manager is further configured to trigger a safe state in the gaming machine when the list of approved USB gaming device interfaces does not include an entry that represents the USB device interface for the first USB gaming peripheral.

6. The gaming machine of claim 1, wherein the list of approved USB gaming device interfaces varies according to a local gaming jurisdiction in which the gaming machine is located.

7. The gaming machine of claim 1, wherein the gaming machine is configured to determine the local gaming jurisdiction.

8. The gaming machine of claim 1, wherein the gaming software modules are approved for use on the gaming machine by one or more of a gaming jurisdiction, a gaming machine manufacturer, a third-party vendor and a standards association.

9. The gaming machine of claim 1, wherein each USB driver is configured to communicate with one or more USB features.

10. The gaming machine of claim 1, wherein the USB device class manager is further configured to control unloading of the USB drivers from the RAM.

11. The gaming machine of claim 10, wherein the USB device class manager is further configured to monitor requests to use each of the USB drivers in the USB interface and to load or unload the USB drivers according to a number of requests to use the USB drivers.

12. The gaming machine of claim 1, wherein the USB device class manager is further configured to reconfigure the USB device interface when one or more of the following occur: 1) when a first USB gaming peripheral is enumerated or un-enumerated on the gaming machine, 2) when the game of chance played on the gaming machine is changed, 3) when a jurisdiction in which is the gaming machine is located is changed, and 4) when jurisdictional requirements of a jurisdiction in which the gaming machine is located are changed.

13. The gaming machine of claim 1, wherein the USB device class manager is further configured to authenticate an identity of a first USB gaming peripheral connected to the gaming machine.

14. The gaming machine of claim 1, wherein the USB device class manager is further configured to authenticate firmware executed by one or more of the USB gaming peripherals.

15. The gaming machine of claim 14, wherein the USB device class manager is further configured to compare a first result from a hashing function applied to the firmware by the USB gaming peripheral with a second result from the hashing function applied to an approved copy of the firmware by the master gaming controller to authenticate the firmware.

16. The gaming machine of claim 1, further comprising: a storage device configured to store approved firmware to be used by one or more of the USB gaming peripherals.

17. The gaming machine of claim 16, wherein the firmware is approved by one or more of a gaming jurisdiction, a gaming machine manufacturer, a third party vendor and a standards association.

18. The gaming machine of claim 1, wherein the USB device class manager is further configured to assign encryption keys used to encrypt and decrypt communications between the USB gaming peripherals and the master gaming controller to one or more of the USB gaming peripherals.

19. The gaming machine of claim 1, wherein the communications between the USB gaming peripherals and the master gaming controller are encrypted.

20. The gaming machine of claim 19, wherein the USB device interfaces are configured to encrypt and decrypt communications that pass through them.

21. The gaming machine of claim 1, wherein the USB device class manager is further configured to trigger a safe state in the gaming machine when an un-approved USB gaming peripheral has been connected to the gaming machine.

22. The gaming machine of claim 1, wherein the USB drivers are loaded as one of shared objects or dynamic link libraries.

23. The gaming machine of claim 1, wherein the USB device class manger is further configured to configure the USB device interface with a first device driver that translates communications between a second device driver and the gaming operating system.

24. The gaming machine of claim 23, wherein the second device driver is configured to provide a POSIX file system interface.

25. The gaming machine of claim 1, wherein the USB device class manager is further configured to support one or more device classes selected from the group consisting of standard USB device classes and vendor-specific device classes.

26. The gaming machine of claim 25, wherein the standard USB device classes are selected from the group consisting of a human interface device class, an audio class and a printer class.

27. The gaming machine of claim 1, wherein a first USB gaming peripheral of the plurality of USB gaming peripherals is initialized without at least a portion of firmware required for operation.

28. The gaming machine of claim 27, wherein the USB device class manager is further configured to determine when the first USB gaming peripheral requires the portion of firmware for operation and to download approved firmware required for operation of the first USB gaming peripheral.

29. The gaming of claim 1, wherein one or more of the USB gaming peripherals are configured to receive polls from the USB device class manager and to enter a safe state when a poll is not received from the USB device class manger within a time interval.

30. The gaming of machine of claim 29, wherein after a first USB gaming peripheral enters the safe state, no monetary claims are allowed against the gaming machine.

31. The gaming machine of claim 1, wherein each of the USB drivers is compatible with at least one standard USB device class or one USB vendor-specific device class.

32. The gaming machine of claim 1, further comprising:

a USB-compatible host controller.

33. The gaming machine of claim 1, further comprising:

a plurality of USB-compatible feature drivers wherein each feature driver communicates with a USB feature on one of the gaming peripherals.

34. The gaming machine of claim 1, wherein the master gaming controller is further configured to run feature client processes that communicate with one of the USB features using a USB driver associated with the one of the USB features.

35. The gaming machine of claim 1, wherein the gaming machine is configured to enumerate each USB gaming peripheral to determine the capabilities of each of the USB gaming peripherals.

36. The gaming machine of claim 1, wherein the gaming machine is a mechanical slot machine, a video slot machine, a keno game, a lottery game, or a video poker game.

37. The gaming machine of claim 1, wherein the master gaming controller includes a memory storing software configured to encrypt, decrypt, or encrypt and decrypt the USB-compatible communications between the master gaming controller and at least one of the USB gaming peripherals.

38. The gaming machine of claim 1, wherein each USB gaming peripheral comprises:

a USB-compatible communication connection, one or more peripheral devices specific to a USB gaming peripheral wherein each peripheral device supports one or more USB features, and a USB peripheral controller configured i) to control the one or more peripheral devices and ii) to communicate with the master gaming controller and peripheral devices using the USB-compatible communication connection.

39. The gaming machine of claim 38, wherein the USB peripheral controller further comprises;

one or more USB-compatible interfaces.

40. The gaming machine of claim 39, wherein each USB-compatible interface is mapped to a single USB feature in the one or more peripheral devices.

41. The gaming machine of claim 38, wherein the USB peripheral controller includes a non-volatile memory configured to store at least one of a) configuration parameters specific to the individual USB gaming peripheral and b) state history information of the USB gaming peripheral.

42. The gaming machine of claim 41, wherein the configuration parameters include a mapping of the USB-compatible interfaces to the USB features.

43. The gaming machine of claim 1, wherein each of the plurality of USB gaming peripherals includes one or more peripheral devices selected from the group consisting of lights, printers, coin hoppers, coin dispensers, bill validators, ticket readers, card readers, key-pads, button panels, display screens, speakers, information panels, motors, mass storage devices, reels, wheels, bonus devices, wireless communication devices, bar-code readers, microphones, biometric input devices, touch screens, arcade stick, thumbsticks, trackballs, touchpads and solenoids.

44. The gaming machine of claim 1, wherein one or more of the USB gaming peripherals further comprise:

a USB-compatible device controller.

45. The gaming machine of claim 1, wherein one or more of the USB gaming peripherals further comprise:

a USB-compatible hub.

46. The gaming machine of claim 1, further comprising:

a storage device configured to store the plurality of gaming software modules.

47. The gaming machine of claim 1, wherein the game of chance is selected from the group consisting of traditional slot games, video slot games, poker games, pachinko games, multiple hand poker games, pai-gow poker games, black-jack games, keno games, bingo games, roulette games, craps games, checkers, board games and card games.

48. The gaming machine of claim 1, wherein at least one of the USB drivers is operable to generate a particular game of chance, and the at least one of the USB drivers is packaged with gaming software modules for the particular game of chance.

49. The gaming machine of claim 48, wherein a first set of USB drivers operable to generate a first game of chance is different from a second set of USB drivers operable to generate a second game of chance.

50. The gaming machine of claim 49, wherein the gaming machine is configured to load the first set of USB drivers when a first package of gaming software modules for the first game of chance is installed on the gaming machine and wherein the gaming machine is configured to load the second set of USB drivers when a second package of gaming software modules is installed on the gaming machine.

* * * * *